(12) United States Patent
Sun et al.

(10) Patent No.: US 11,821,906 B2
(45) Date of Patent: Nov. 21, 2023

(54) SAMPLE FEEDING APPARATUS, SAMPLE ANALYZING DEVICE, AND CONTROL METHOD FOR SAMPLE FEEDING APPARATUS

(71) Applicant: SHENZHEN MINDRAY BIO-MEDICAL ELECTRONICS CO., LTD., Shenzhen (CN)

(72) Inventors: JuanJuan Sun, Shenzhen (CN); Yanwen Weng, Shenzhen (CN); Chuanfen Xie, Shenzhen (CN); Yang Zhou, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 595 days.

(21) Appl. No.: 17/013,588

(22) Filed: Sep. 5, 2020

(65) Prior Publication Data
US 2020/0400701 A1    Dec. 24, 2020

Related U.S. Application Data

(63) Continuation of application No. PCT/CN2018/079361, filed on Mar. 16, 2018.

(51) Int. Cl.
*G01N 35/02* (2006.01)
*G01N 35/04* (2006.01)

(52) U.S. Cl.
CPC ... *G01N 35/026* (2013.01); *G01N 2035/0412* (2013.01); *G01N 2035/0462* (2013.01)

(58) Field of Classification Search
CPC ......... G01N 35/026; G01N 2035/0412; G01N 2035/0462; G01N 2035/0465; G01N 2035/0472

See application file for complete search history.

(56) References Cited

U.S. PATENT DOCUMENTS

2005/0195684 A1*  9/2005  Mayer ................ B01L 9/52
                                                366/279
2009/0142844 A1*  6/2009  Le Comte ............ G01N 35/04
                                                901/6
(Continued)

FOREIGN PATENT DOCUMENTS

CN    101218493 A    7/2008
CN    102221624 A    10/2011
(Continued)

OTHER PUBLICATIONS

International Search Report issued in corresponding International Application No. PCT/CN2018/079361, dated Mar. 16, 2018, 6 pages.

*Primary Examiner* — Jill A Warden
*Assistant Examiner* — John McGuirk
(74) *Attorney, Agent, or Firm* — Kory D. Christensen

(57) ABSTRACT

A sample feeding apparatus, a sample analyzing device, and a control method for a sample feeding apparatus are disclosed. At least two of a feeding unit, a temporary storage unit, and a recovery unit together form a vertical stack structure, and a dispatching manipulator transfers a sample vessel among the feeding unit, the temporary storage unit, the recovery unit, and a sample aspiration region. The space in a vertical direction can be reasonably utilized, superposition is performed in space to simplify the dispatching process, and the occupation of a horizontal space is reduced. As a result, the floor space is reduced, and the apparatus is further miniaturized.

19 Claims, 13 Drawing Sheets

(56) References Cited

U.S. PATENT DOCUMENTS

| | | | |
|---|---|---|---|
| 2012/0058900 A1 | 3/2012 | Gisler et al. | |
| 2014/0079527 A1* | 3/2014 | Takai | ............... G01N 35/026 |
| | | | 422/65 |
| 2017/0052205 A1 | 2/2017 | Silbert | |

FOREIGN PATENT DOCUMENTS

| | | |
|---|---|---|
| CN | 204740254 U | 11/2015 |
| CN | 106153959 A | 11/2016 |
| CN | 106170703 A | 11/2016 |
| CN | 107121561 A | 9/2017 |
| CN | 107748250 A | 3/2018 |
| CN | 207067138 U | 3/2018 |
| CN | 207992254 U | 10/2018 |
| JP | H07234228 A | 9/1995 |
| WO | 2015157972 A1 | 10/2015 |

* cited by examiner

SAMPLE FEEDING APPARATUS, SAMPLE ANALYZING DEVICE, AND CONTROL METHOD FOR SAMPLE FEEDING APPARATUS

CROSS-REFERENCE OF RELATED APPLICATION

This application is a bypass continuation of Patent Cooperation Treaty Application No. PCT/CN2018/079361, filed on Mar. 16, 2018, the content thereof is hereby incorporated by reference in its entirety.

TECHNICAL FIELD

The present application relates to the field of medical instruments, and in particular to a structure and control method for sample feeding of samples.

BACKGROUND

Sample feeding apparatuses mainly have functions of loading, dispatching, transfer, positioning and recovery of sample holders, and a function of automatic recognition for barcode information of sample holders and sample tubes. The sample feeding apparatus can be generally divided into a feeding unit, a temporary storage unit, a dispatching mechanical unit, a recovery unit, a front-end sample aspiration region, etc. in terms of the functions.

At present, the arrangement of units commonly used in the sample feeding apparatus mainly has the following two forms:

1. The feeding, temporary storage, recovery units are integrally provided, and the dispatching manipulator and the front-end sample aspiration region are separately arranged. For example, the Chinese Patent (CN 203929791 U) entitled "Sample holder conveying system with RFID recognition for sample holders and biochemical and immune assay integrated machine thereof" introduces a sample holder conveying system, comprising a sample holder conveying track and a sample holder. The sample holder conveying track is of a fixed compartment channel type. Such a fixed compartment can serve as a sample feeding unit and a recovery unit, as well as a sample temporary storage unit. However, such a structure is only suitable for machines with small sample size, which has a limited sample temporary storage capacity.

2. The feeding unit, the temporary storage unit, the recovery unit, the dispatching manipulator, and the front-end sample aspiration region are arranged independent of each other and in a tiled manner. In such a structure, the regions are lined up in space. As the test size increases, the space in each region is larger, resulting in a larger occupied space of the entire sample feeding apparatus, such that the footprint of the instrument increases, which cannot meet the demands of increasingly crowded laboratory conditions.

SUMMARY

The present application mainly provides a new sample feeding apparatus and sample analyzing device, and also provides a control method for the sample feeding apparatus.

According to a first aspect, in one embodiment, a sample feeding apparatus is provided, comprising:
  a feeding unit configured to receive sample vessels, each sample vessel having a sample to be processed;
  a temporary storage unit having a temporary storage position and configured to temporarily store the sample;
  a recovery unit configured to recover the sample vessels, and at least two of the feeding unit, the temporary storage unit, and the recovery unit together form a vertical stack structure;
  a sample aspiration region configured to provide a sample aspiration position such that a detection instrument is capable of aspirating the sample from each sample vessel;
  a dispatching manipulator configured to transfer the sample among the feeding unit, the temporary storage unit, the recovery unit, and the sample aspiration region; and
  a control unit configured to control the dispatching manipulator.

In one of the embodiments, the feeding unit and the recovery unit are located above the temporary storage unit.

In one of the embodiments, the temporary storage unit has at least two temporary storage positions arranged side-by-side, the feeding unit and the recovery unit are located above the temporary storage unit and are arranged one behind the other in an arrangement direction of the temporary storage positions, the feeding unit and the recovery unit are located at one side of the dispatching manipulator, and the sample aspiration region is located at the other side of the dispatching manipulator.

In one of the embodiments, the feeding unit and the dispatching manipulator are respectively located on two sides of the recovery unit, and the sample aspiration region is located on one side of the dispatching manipulator that is away from the recovery unit.

In one of the embodiments, the sample aspiration region comprises a sample aspiration and transfer channel configured to transfer the sample vessel with the sample for sample aspiration.

In one of the embodiments, the feeding unit comprises a storage assembly capable of storing at least two sample holders, the sample holders are configured to receive a sample vessel, the feeding unit has a storage assembly placement position, the storage assembly is accessibly arranged inside the storage assembly placement position, and the storage assembly has a sample outlet where the sample holders are moved into or out of the storage assembly.

In one of the embodiments, the storage assembly placement position is provided with a storage assembly detection mechanism configured to detect whether the storage assembly is loaded properly.

In one of the embodiments, the feeding unit has a feeding push-out mechanism, which is configured to push the sample out of the sample outlet from a storage position of the storage assembly.

In one of the embodiments, each of the storage assemblies is correspondingly provided with a feeding push-back mechanism, which is arranged corresponding to the sample outlet of the storage assembly and is configured to push the sample holder in the feeding unit back to the storage assembly or limit the sample holder within the sample outlet.

In one of the embodiments, the sample feeding apparatus further comprises a sample feeding channel, wherein the sample outlet of the storage assembly is in communication with the sample feeding channel, to enable the sample holder to enter the dispatching manipulator through the sample feeding channel and the sample outlet.

In one of the embodiments, the sample feeding apparatus further comprises a sample pushing mechanism, wherein the sample pushing mechanism is configured to push the sample holder from the sample outlet to the dispatching manipulator along the sample feeding channel.

In one of the embodiments, the recovery unit comprises a recovery assembly capable of storing at least two sample holders, each sample holder is configured to receive the sample vessel, the recovery assembly has a recovery inlet used for the sample holders to enter, the recovery unit has a recovery assembly placement position, and the recovery assembly is accessibly arranged inside the recovery assembly placement position.

In one of the embodiments, the recovery assembly placement position is provided with a recovery assembly detection mechanism configured to detect whether the recovery assembly is loaded.

In one of the embodiments, the recovery unit comprises recovery push-in mechanisms, each of which corresponds to the recovery inlet of the recovery assembly and is configured to push the recovered sample holder into the recovery assembly.

In one of the embodiments, the sample feeding apparatus further comprises a sample recovery channel, wherein the sample recovery channel is in communication with the recovery inlet of the recovery assembly, to enable the sample holder on the dispatching manipulator to enter into the recovery assembly through the sample recovery channel and the recovery inlet.

In one of the embodiments, the sample feeding apparatus further comprises a recovery pushing mechanism, wherein the recovery pushing mechanism is configured to push the sample from the dispatching manipulator to the recovery inlet along the sample recovery channel.

In one of the embodiments, the recovery unit comprises at least two recovery assemblies, the feeding unit comprises at least two storage assemblies, and the number of the recovery assemblies is the same as the number of the storage assemblies.

In one of the embodiments, a sample access channel is provided between the feeding unit and the recovery unit, the sample access channel is in communication with both the feeding unit and the recovery unit, and the dispatching manipulator is aligned with the sample access channel while transferring the sample vessels from the feeding unit or into the recovery unit.

In one of the embodiments, the sample access channel is provided with a sample access pushing mechanism configured to push the sample holder out of and back into the sample access channel.

In one of the embodiments, the sample feeding apparatus further comprises an emergency sample feeding channel, wherein the emergency sample feeding channel is separately arranged, with an outlet thereof being arranged facing the dispatching manipulator.

In one of the embodiments, the sample feeding apparatus further comprises a scanning unit configured to scan the sample, wherein the feeding unit is provided with a sample feeding channel, one end of the sample feeding channel passes around the recovery unit and extends to the position where the dispatching manipulator is located, and the scanning unit is arranged in the sample feeding channel.

In one of the embodiments, the sample feeding apparatus further comprises a scanning unit configured to scan the sample, wherein the scanning unit is arranged below the recovery unit and the feeding unit, and the scanning unit and the temporary storage unit are arranged one behind the other;

or the scanning unit is arranged above the temporary storage unit, and the scanning unit and the recovery unit and/or the feeding unit are arranged side-by-side.

In one of the embodiments, the sample access channel is internally provided with a scanning unit for scanning the fed sample.

In one of the embodiments, the dispatching manipulator comprises a sample holder storage mechanism for storing the sample holders and a dispatching drive mechanism, the sample holders is configured to receive the sample vessel, the dispatching drive mechanism outputs a reciprocating motion in a vertical direction so as to drive the sample holder storage mechanism to at least move in the vertical direction.

In one of the embodiments, the temporary storage unit has at least two temporary storage positions arranged side-by-side, and the dispatching drive mechanism outputs a reciprocating motion in an arrangement direction of the temporary storage positions, such that the sample holder storage mechanism is capable of moving to any of the temporary storage positions, with the arrangement direction of the temporary storage positions being a Y-axis, the vertical direction being a Z-axis, and the Y-axis and the Z-axis being perpendicular to each other.

In one of the embodiments, the sample holder storage mechanism has an accommodation slot matching the sample holder in shape, and at least one side of the accommodation slot is provided with a bell-mouth-shaped opening tapered from outside towards inside to facilitate the sample holder to enter.

In one of the embodiments, the dispatching drive mechanism comprises a first drive mechanism configured to drive the sample holder storage mechanism to move along the Y-axis, and a second drive mechanism configured to drive the sample holder storage mechanism to move along the Z-axis, the sample holder storage mechanism is mounted on the second drive mechanism, and the second drive mechanism is mounted on the first drive mechanism.

In one of the embodiments, the first drive mechanism comprises a first stepping motor, and a first synchronous belt transmission mechanism that is driven by the first stepping motor, and the second drive mechanism is mounted on a synchronous belt of the first synchronous belt transmission mechanism.

In one of the embodiments, the second drive mechanism comprises a second stepping motor, and a lead screw-nut mechanism that is driven by the second stepping motor, and the sample holder storage mechanism is mounted on the lead screw-nut mechanism.

In one of the embodiments, the dispatching manipulator further comprises an actuation claw, and an actuation claw drive mechanism configured to drive the actuation claw to move, the actuation claw drive mechanism outputs reciprocating motions along the X-axis and along the Z-axis, with the X-axis, the Y-axis and the Z-axis being perpendicular to one another, and the X-axis being the direction in which the sample holder moves into and out of the accommodation slot, such that the actuation claw is capable of moving along the X-axis and along the Z-axis, so as to pick up or release the sample holder.

In one of the embodiments, the actuation claw has two pick-up claws arranged opposite each other, with the distance between the pick-up claws being greater than the length of the sample holder.

In one of the embodiments, the actuation claw is arranged below the accommodation slot, the bottom of the accommodation slot is provided with an access opening reserved for the actuation claw, and the bottom of the temporary storage position of the temporary storage unit is provided with an avoidance opening reserved to keep off the actuation claw.

In one of the embodiments, the actuation claw drive mechanism comprises an extension-retraction drive motor and a cam; the cam rotates with an output end of the extension-retraction drive motor, and has a closed guide slot in which the actuation claw is movably mounted; the distance from a slot wall of the guide slot to the center of rotation of the cam is unequal, such that the actuation claw is driven to telescopically move during the turning of the cam, thereby forming a motion along the Z-axis.

In one of the embodiments, the actuation claw drive mechanism comprises a translation drive motor and a third synchronous belt transmission mechanism, the third synchronous belt transmission mechanism is mounted on the translation drive motor, the extension-retraction drive motor and the cam are fixed to the synchronous belt of the third synchronous belt transmission mechanism, thereby forming a motion along the X-axis.

In one of the embodiments, a bottom wall and/or a side wall of the accommodation slot is made of rubber to increase the friction between the bottom wall and/or the side wall and the sample holder.

In one of the embodiments, a protruding elastic member is mounted at the side wall of the accommodation slot to apply an elastic force to the sample holder when the sample holder enters the accommodation slot.

In one of the embodiments, the sample holder storage mechanism is provided with a vacancy detection mechanism configured to detect whether there is a sample holder at the temporary storage position of the temporary storage unit.

According to the first aspect, in one embodiment, a sample analyzing device is provided, comprising the sample feeding apparatus of any one described above, and a detection instrument configured to detect a sample, wherein the detection instrument is arranged corresponding to a sample aspiration region of the sample feeding apparatus.

Provided is a control method for a sample feeding apparatus. The sample feeding apparatus comprises a feeding unit configured to receive sample vessels, each sample vessel having a sample to be processed, a temporary storage unit configured to temporarily store the sample vessels, a recovery unit configured to recover the sample vessels, a sample aspiration region, a dispatching manipulator configured to transfer the sample vessels, and a control unit, and at least two of the feeding unit, the temporary storage unit and the recovery unit together form a vertical stack structure; and the control method comprising:
a sample feeding step, in which the dispatching manipulator receives a sample from the feeding unit, and then delivers the sample to the temporary storage unit for temporary storage or to the sample aspiration region; and
a recovery step, in which the dispatching manipulator delivers the sample after sample aspiration to the recovery unit for recovery.

In one of the embodiments, the feeding unit and the recovery unit are located above the temporary storage unit; and in the conventional sample feeding step, when a sample needs to be carried to the temporary storage unit, the dispatching manipulator obtains the sample from the feeding unit, and the control unit controls the dispatching manipulator to move downwards to deliver the sample into the temporary storage unit for temporary storage.

In one of the embodiments, the sample feeding apparatus further comprising a scanning unit,
with the scanning unit and the feeding unit being arranged side-by-side above the temporary storage unit, and the scanning unit being in communication with a sample outlet of the feeding unit; the control method further comprises:
a scanning step, in which the control unit controls the sample unloaded by the feeding unit to pass through the scanning unit for scanning, and the scanned sample is delivered to the dispatching manipulator for dispatching;
or the scanning unit is arranged below the recovery unit and the feeding unit, and the scanning unit and the temporary storage unit are arranged one behind the other; and the control method further comprises:
a scanning step, in which when the dispatching manipulator obtains a sample during the sample feeding, the control unit controls the dispatching manipulator to move downwards to deliver the sample to the scanning unit for scanning, and the scanned sample is delivered to the dispatching manipulator and is subsequently delivered to the temporary storage unit or to the sample aspiration region by the dispatching manipulator.

In one of the embodiments, the sample feeding apparatus further comprising an emergency channel, the control method further comprises:
an emergency sample feeding step, in which when receiving an emergency indication, the control unit indicates the dispatching manipulator to preferentially obtain a sample from the emergency channel after completing the current operation instruction and deliver the sample to the sample aspiration region for sample aspiration.

In one of the embodiments, the sample aspiration region has a sample aspiration and transfer channel and an emergency sample aspiration and transfer channel, the sample aspiration and transfer channel is configured to transfer the sample supplied from the feeding unit, the emergency sample aspiration and transfer channel is configured to transfer the sample, supplied from the emergency channel, during the emergency sample feeding step, and in the emergency sample feeding step, the dispatching manipulator delivers the sample supplied from the emergency channel to the emergency sample aspiration and transfer channel.

In one of the embodiments, the feeding unit having at least two accessible storage assemblies, in the conventional sample feeding step, the control unit determines the number of the storage assemblies in the feeding unit; if there is only one storage assembly, sample feeding is carried out from the storage assembly; if there are two or more storage assemblies, the control unit determines whether an instruction of priority sample feeding of one of the storage assemblies is received, if so, the storage assembly specified by the instruction is preferentially controlled to perform sample feeding; and if not, the storage assemblies are controlled to perform sample feeding according to a preset sequence.

In one of the embodiments, in the conventional sample feeding step, the control unit detects whether the number of samples in the storage assembly of current sample feeding is zero, if so, the control unit activates another storage assembly for sample feeding or sends a signal that the storage assembly is unoccupied.

In one of the embodiments, the recovery unit comprising a recovery assembly capable of storing at least two sample holders, in the recovery step, the control unit determines the number of the recovery assemblies in the recovery unit; if there is only one recovery assembly, the recovery assembly is set to recover the sample; if there are two or more recovery assemblies, the control unit determines whether an instruction of priority sample recovery of one of the recovery assemblies is received, if so, the recovery assembly specified by the instruction is preferentially controlled to recover the sample; and if not, the recovery assemblies are controlled to recover the sample according to a preset sequence.

In one of the embodiments, in the recovery step, the control unit detects whether the currently operated recovery assembly is full, if so, the control unit activates another recovery assembly to recover the sample or sends a signal that the recovery assembly is full.

For the sample feeding apparatus according to the embodiments described above, at least two of the feeding unit, the temporary storage unit, and recovery unit together form a vertical stack structure, and the dispatching manipulator is configured to transfer sample holders between the feeding unit, the temporary storage unit, the recovery unit, the sample aspiration region. According to the present application, the space in the vertical direction can be reasonably used, performing stacking in the space so as to simplify the dispatching process. In addition, the occupation of the horizontal space is reduced, such that the footprint is reduced, and the apparatus is more miniaturized.

DESCRIPTION OF THE PREFERRED EMBODIMENTS

Figure 1:
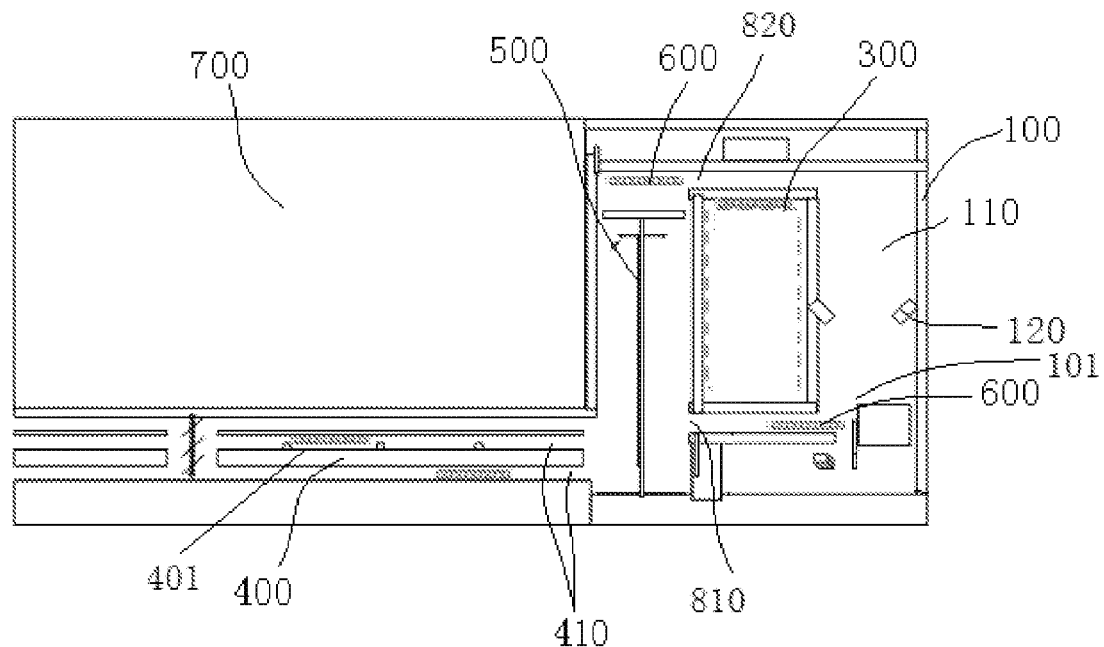
FIG. 1 is a simplified schematic diagram of a sample feeding apparatus according to one embodiment of the present application.

The present application will be further described in detail below through specific embodiments in conjunction with the accompanying drawings. Associated similar element reference numerals are used for similar elements in various embodiments. In the following embodiments, many details are described such that the present application can be better understood. However, it would have been effortlessly appreciated by those skilled in the art that some of the features could be omitted or could be substituted by other elements, materials, and methods in each case. In certain cases, some operations involved in the present application are not displayed or described in the specification, which is to prevent the core part of the present application from being obscured by too much description. Moreover, for those skilled in the art, the detailed description of the involved operations is not necessary, and the involved operations can be thoroughly understood according to the description in the specification and the general technical knowledge in the art.

In addition, the characteristics, operations, or features described in the specification can be combined in any appropriate manner to form various embodiments. Moreover, the steps or actions in the method description can also be exchanged or adjusted in order in a way that would have been obvious to those skilled in the art. Therefore, the various orders in the specification and drawings are merely for the purpose of clear description of a certain embodiment and are not meant to be a necessary order unless otherwise stated that a certain order must be followed.

The serial numbers themselves for the components herein, for example, "first", "second", etc., are merely configured to distinguish the described objects, and do not have any sequential or technical meaning. Moreover, as used in the present application, "connection" or "coupling", unless otherwise specified, includes both direct and indirect connections (couplings).

The present application provides a sample feeding apparatus, comprising a feeding unit, a temporary storage unit, a recovery unit, a sample aspiration region, a dispatching manipulator, and a control unit.

The feeding unit is configured to receive sample vessels, each sample vessel has a sample to be processed. The temporary storage unit refers to a structure that forms temporary storage positions for temporary storage of the sample vessels. The recovery unit is configured to recover the sample vessels with the processed samples. The sample aspiration region is configured to provide a sample aspiration position such that a detection instrument is capable of aspirating the sample from each vessel.

At least two of the feeding unit, the temporary storage unit, and recovery unit together form a vertical stack structure, and the dispatching manipulator is configured to transfer sample holders between the feeding unit, the temporary storage unit, the recovery unit, the sample aspiration region. The control unit is configured to control the dispatching manipulator. In addition, the control unit can also control the feeding unit, the temporary storage unit, the recovery unit, and the structure in the sample aspiration region.

In this way, the space in the vertical direction can be reasonably used, performing stacking in the space so as to simplify the dispatching process. In addition, the occupation of the horizontal space is reduced, such that the footprint is reduced, and the apparatus is more miniaturized.

In general, the sample is received in a sample vessel, such as a test tube. In order to improve the efficiency of sample feeding, in some embodiments of the present application, the transfer of the sample by the units and the dispatching manipulator is based on the sample holder, i.e., the transfer of the sample is implemented by transferring the sample holder holding the sample. In some embodiments, the sample and the sample vessel can be directly transferred, but the sample holder is not suitable.

Further, preferably, in some embodiments, the feeding unit and the recovery unit are located above the temporary storage unit. Since the feeding unit and the recovery unit are arranged above, an operator can conveniently place and pick up the sample, thereby improving the convenience of operation.

The present application will be further described in detail below through specific embodiments in conjunction with the accompanying drawings.

Embodiment I

Figure 2:
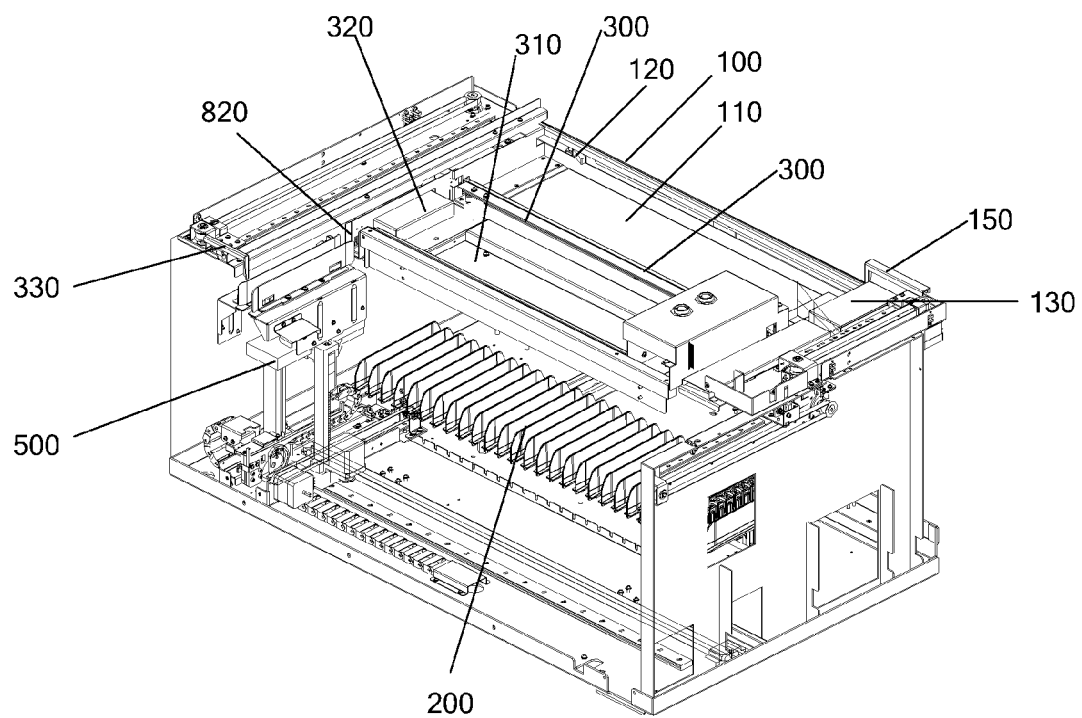
FIG. 2 is a diagram of a specific structure (excluding a sample aspiration region and a detection instrument) of the sample feeding apparatus according to the one embodiment of the present application.

Referring to FIGS. 1 and 2, in one embodiment, a sample feeding apparatus is provided. In the sample feeding apparatus, a feeding unit 100 and a recovery unit 300 are located above a temporary storage unit 200. The feeding unit 100 and the dispatching manipulator 500 are respectively located on two sides of the recovery unit 300, and the sample aspiration region 400 is located on one side, away from the recovery unit 300, of the dispatching manipulator 500. In general, the sample aspiration region 400 is configured to place some detection instruments 700, and the detection instruments 700 perform sample aspiration at a sample aspiration position 401 of the sample aspiration region and continue to perform related detection. Such an arrangement can not only reduce the footprint of the entire apparatus, but also facilitates the reduction of the moving travel of the dispatching manipulator, thereby simplifying the structure and improving the operation efficiency.

In this embodiment, the recovery unit 300 is arranged directly above the temporary storage unit 200. In FIG. 1, the temporary storage unit 200 is blocked by the recovery unit 300, and is thus not shown. In other embodiments, the feeding unit 100 may also be arranged directly above the temporary storage unit 200. Alternatively, the feeding unit 100 and the recovery unit 300 are arranged in a vertical stacked structure. Still alternatively, the three units are stacked one above the other to form a three-layered structure. Furthermore, in the stacked structure, the desired region can be arranged above or below according to requirements. In FIGS. 1 and 2, the feeding unit 100 and the recovery unit 300 are arranged above the temporary storage unit 200, such that the sample holder inside the feeding unit 100 and the recovery unit 300 can be conveniently placed and picked up.

Referring to FIGS. 1 and 2, based on the concept shown in FIG. 1, FIG. 2 provides a more specific structure (the sample aspiration region 400 is not shown in FIG. 2). The recovery unit 300 is located directly above the temporary storage unit 200, and the sample aspiration region 400 (not shown in FIG. 2) and the feeding unit 100 are respectively located on two sides of the temporary storage unit 200 and the recovery unit 300.

The feeding unit 100 mainly implements the feeding operation of the sample holder 600. Referring to FIGS. 1 and 2, in one embodiment, the feeding unit 100 comprises a sample storage chamber 110, a feeding push-out mechanism 120 and a feeding push-back mechanism 130 (which may be omitted). The feeding push-out mechanism 120 is arranged in the sample storage chamber 110, and the feeding push-back mechanism 130 is arranged at the end of the sample storage chamber 110.

The feeding push-out mechanism 120 is configured to push the sample holder 600 along the sample storage chamber 110. The feeding push-back mechanism 130 is mainly used in some special cases where emergency samples need to be processed preferentially, in which it is necessary to interrupt the original feeding sequence of the sample holders 600 and insert the emergency sample holder 600. In this case, it is necessary to control the feeding push-back mechanism 130 to push back the sample holder 600 in a direction opposite the sample feeding direction, to leave a spacing for at least one sample holder 600, so as to load the emergency sample holder 600.

With continued reference to FIGS. 1 and 2, in one embodiment, a sample feeding channel 810 is further comprised. The feeding unit 100 is in communication with the sample feeding channel 810, such that the sample holders (or the sample holder 600 holding the sample) can be transferred to the dispatching manipulator 500 through the sample feeding channel 810 and the sample outlet.

One end of the sample feeding channel 810 pass around the recovery unit 300 and extends to the position where the dispatching manipulator 500 is located. In this way, the dispatching manipulator 500 can conveniently obtain the sample holder 600, and by means of a rational arrangement, the whole apparatus is organized to improve the space utilization.

With continued reference to FIG. 2, in one embodiment, a sample pushing mechanism 150 is further comprised. The sample pushing mechanism 150 has a moving travel toward the dispatching manipulator 500, and is configured to push the sample holder 600 from the sample feeding channel 810 to the dispatching manipulator 500.

Of course, in some embodiments, the sample holder 600 at the sample feeding channel 810 may also move from the sample feeding channel 810 to the dispatching manipulator 500 by means of a corresponding structure on the dispatching manipulator 500.

The feeding push-out mechanism 120, the feeding push-back mechanism 130 and the sample pushing mechanism 150 may implement the operation for the sample holder 600 by means of various structures, such as a push rod, an actuation block, a suction cup, and a clamp, and the driving part may be implemented using an electric motor, a pneumatic cylinder, a hydraulic cylinder, etc., which will not be described herein again.

Further, in one embodiment, a scanning unit (not shown in the figure) for scanning the sample is further comprised. The scanning unit is arranged in the sample feeding channel 810, and is configured to scan the sample or the sample holder, so as to obtain information of the sample.

Furthermore, the scanning unit may also be separately arranged at the lower layer where the temporary storage unit 200 is located.

Further, referring to FIG. 2, in one embodiment, the recovery unit 300 may be configured to store the sample holder 600 after the test is completed. In this embodiment, the recovery unit 300 comprises a recovery chamber 310 and a recovery push-in mechanism 320. The recovery push-in mechanism 320 is configured to push the sample to be recovered into the recovery chamber 310 of the recovery unit 300.

Referring to FIGS. 1 and 2, in one embodiment, a sample recovery channel 820 is further comprised. The sample recovery channel 820 is in communication with the recovery unit 300, such that the sample holder on the dispatching manipulator 500 can be transferred to the recovery unit 300 through the sample recovery channel 820.

Referring to FIG. 2, a recovery pushing mechanism 330 is further comprised. The recovery pushing mechanism 330 is configured to push the sample holder from the dispatching manipulator 500 to a recovery inlet of the recovery unit 300.

In other embodiments, the sample holder 600 may also be actively moved into the recovery chamber 310 by the dispatching manipulator 500, without the need to provide a recovery pushing mechanism 330.

The recovery push-in mechanism 320 and the recovery pushing mechanism 330 may be formed using various structures, such as a push rod, an actuation block, a suction cup, and a clamp, and the driving part may be implemented using an electric motor, a pneumatic cylinder, a hydraulic cylinder, etc.

Of course, in some embodiments, the recovery push-in mechanism 320 and the recovery pushing mechanism 330 may also be implemented using one pushing mechanism.

Figure 3:
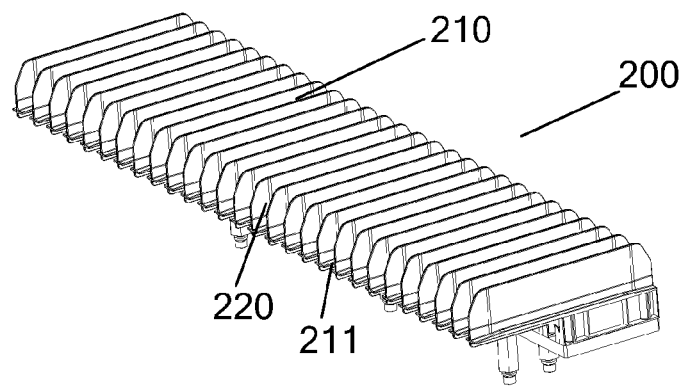
FIG. 3 is a schematic diagram of a temporary storage position in the sample feeding apparatus according to the one embodiment of the present application.

Further, referring to FIGS. 2 and 3, in one embodiment, the height of the feeding unit 100 is approximately equal to the height of the recovery unit 300, such that the two units can be substantially in the same plane in the horizontal plane, which facilitates the overall appearance attractiveness and also facilitates the arrangement of the structure. For example, the recovery unit 300 and the temporary storage unit 200 are constructed to be one above the other. When the feeding unit 100 and the recovery unit 300 are horizontally in the same plane, there is a large space, in the vertical direction, for the position where the feeding unit 100 is located. Therefore, several sample storage chambers 110 can be additionally provided and are vertically arranged in stack, thereby increasing the number of the sample holders 600 stored inside the feeding unit 100.

Referring to FIG. 3, in one embodiment, the temporary storage unit 200 is configured to temporarily store the sample vessel with a sample to be tested and/or the sample vessel with a sample to be retested. The temporary storage unit 200 generally has a fixed channel-type structure without a movable component. Each temporary storage position 210 has the length and spacing corresponding to the size of the sample holder 600.

In some embodiments, the inlet of the temporary storage position 210 of the temporary storage unit 200 may be configured to be of bell-mouth-shaped tapered from outside towards inside, so as to facilitate the sample holder 600 to enter and leave.

Furthermore, with continued reference to FIGS. 2 and 3, the sample feeding channel 810 of the feeding unit 100 and the sample recovery channel 820 are substantially in the same vertical plane as the sample holder access opening 220 of the temporary storage unit 200, such that the access openings for the sample holder 600 in the regions can be integrated to the same plane, which facilitates planning the travel of the dispatching manipulator 500, such that the dispatching manipulator 500 can complete the transfer of the sample holder 600 between the regions in a very simple manner and with a short travel.

Similarly, for the sample aspiration region 400, a pushing mechanism may also be provided to push the sample holder 600 from the dispatching manipulator 500 to the sample aspiration region 400 or from the sample aspiration region 400 to the dispatching manipulator 500. In addition, the pushing operation may also be implemented by means of a pushing mechanism on the dispatching manipulator 500, for example, the actuation claw 551 or other structures, such as a suction cup and a clamp, which will be described below.

The feeding unit 100, the temporary storage unit 200, the recovery unit 300 and the sample aspiration region 400 described above can also implement the carrying of the sample holder 600 by manual operation, in addition to implementing the movement of the sample holder 600 in the respective region by means of a pushing mechanism provided therein or separately. For example, the sample holder 600 is manually placed into the feeding unit 100 and is pushed to move inside the feeding unit 100, until the sample holder 600 is picked up by the dispatching manipulator 500. Still for example, the sample holders 600 are manually pushed to move inside the recovery unit 300, such that the sample holders 600 are arranged inside the recovery unit 300 and wait for recovery.

In another aspect, the dispatching manipulator 500 may be only a receiving and carrying apparatus, and does not have the ability to actively obtain the sample holder 600. In addition, the dispatching manipulator, in addition to the receiving and carrying functions, may also actively obtain the sample holder 600 from the regions (or some of the regions).

Further, with continued reference to FIGS. 1-3, in one embodiment, the temporary storage unit 200 and the recovery unit 300 form a dispatching space between same and the sample aspiration region 400, the dispatching manipulator 500 is arranged in the dispatching space, and the sample aspiration and transfer channel 410 of the sample aspiration region 400, the sample feeding channel 810, the sample recovery channel 820, and the sample holder access opening 220 of the temporary storage unit 200 are arranged facing the dispatching manipulator 500, so as to conveniently move the sample holder 600 by the dispatching manipulator 500 to the sample aspiration region 400, and also conveniently move the sample holder 600 subjected to the detection from the sample aspiration region 400 into the recovery unit 300.

In one embodiment, the dispatching manipulator 500 comprises a sample holder storage mechanism configured to receive the sample holder 600, and a dispatching drive mechanism. The dispatching drive mechanism outputs a reciprocating motion in the vertical direction to drive the sample holder storage mechanism to at least move in the vertical direction to implement the vertical stack structure, such that the sample holder storage mechanism is driven to transfer the sample holder 600 between the regions.

The sample holder storage mechanism may be a cavity structure having a storage assembly placement position, or may be a vacuum suction cup or a clamp. Regardless of the method used, the mechanism that enables the sample holder 600 to move with the structure is considered to be the sample holder storage mechanism of the present application.

The dispatching drive mechanism is designed according to the actual travel required by the sample holder storage mechanism, and may be one drive mechanism or multiple drive mechanisms. The drive source may use an electric motor, a pneumatic cylinder, a hydraulic cylinder, or other apparatuses. According to actual needs, the sample holder storage mechanism is driven by the dispatching drive mechanism to at least complete the movement in the vertical direction. Thus, the movement of the sample holder storage mechanism between the feeding unit 100, the temporary storage unit 200, the recovery unit 300, and the sample aspiration region 400 is achieved.

In some embodiments, referring to FIGS. 2 and 3, the sample aspiration region 400 comprises a sample aspiration and transfer channel 410 configured to transfer the sample for sample aspiration. In some embodiments, the sample feeding channel 810, the sample holder access opening 220 of the temporary storage unit 200, the sample recovery channel 820, and the sample aspiration and transfer channel 410 of the sample aspiration region 400 may be arranged in the same vertical line or two symmetric vertical lines. In this case, the dispatching manipulator 500 can complete the transfer of the sample holder 600 only by moving in the vertical direction.

For example, in one embodiment, the feeding unit 100, the temporary storage unit 200 and the recovery unit 300 are arranged in a stacking manner, with the access openings or the respective channels thereof being in the same vertical line, the sample aspiration region 400 is arranged opposite the above three units, the sample aspiration and transfer channel 410 of the sample aspiration region 400 is located in another vertical line opposite the access openings of the above three units, the dispatching manipulator 500 is then arranged between the sample aspiration region 400 and the other three regions, the sample holder storage mechanism is configured such that two ends thereof can enter and leave the sample holder 600, and then the transfer of the sample holder 600 can be implemented only by means of the movement in the vertical direction.

Referring to FIGS. 2 and 3, in one embodiment, the temporary storage unit 200 has at least two temporary storage positions 210 arranged side-by-side (in some embodiments, only one temporary storage position 210 may be provided), and the temporary storage position 210 may have a lattice structure. If multiple temporary storage positions 210 are provided, the dispatching drive mechanism outputs a reciprocating motion in an arrangement direction of the temporary storage positions 210, such that the sample holder storage mechanism can move to any of the temporary storage positions 210 to store and pick up the sample holder 600 at any of the temporary storage positions 210.

In this embodiment, the arrangement direction of the temporary storage position 210 is defined as a Y-axis, and the vertical direction is defined as a Z-axis. Preferably, the Y-axis and the Z-axis are perpendicular to each other, which enables the whole apparatus to be organized, and also facilitates the travel of the arranged dispatching manipulator 500 in various directions.

Figure 4:
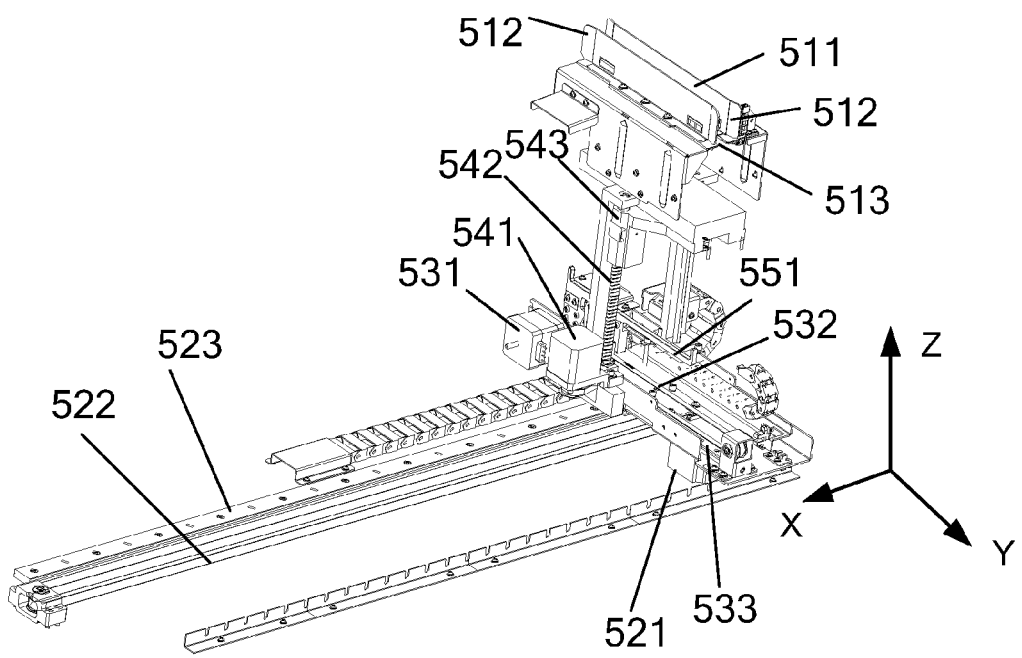
FIG. 4 is a schematic diagram of a dispatching manipulator in the sample feeding apparatus according to the one embodiment of the present application.

This embodiment provides an example structure of the dispatching manipulator 500. Referring to FIGS. 2 and 4, in one embodiment, the sample holder storage mechanism of the dispatching manipulator 500 has an accommodation slot 511 matching the sample holder 600 in shape. The matching in shape means that the accommodation slot 511 has a shape that can accommodate the sample holder 600. The shape may be a shape consistent with the sample holder 600, and may also be a shape that can contain the sample holder 600. The accommodation slot 511 can accommodate the sample holder 600, such that the sample holder 600 moves with the dispatching manipulator 500.

The accommodation slot 511 has an opening 512 on at least one side, and preferably has openings 512 on both sides, such that the sample holder 600 can enter and leave from both sides. The opening 512 on at least one side of the accommodation slot 511 is configured to be a bell mouth tapered from outside towards inside. The bell mouth has a guide function to facilitate the entry of the sample holder 600.

With such a design of having openings 512 on both sides, the sample holder 600 can enter and leave the accommodation slot 511 from both sides. Therefore, the dispatching manipulator 500 does not necessarily rotate 180° during the carrying for the purpose of aligning inlets or outlets in the regions, especially as shown in FIGS. 1 and 2, the arrangement in which the regions are distributed in an opposite manner on two sides of the dispatching manipulator 500 further simplifies the moving travel of the dispatching manipulator 500.

Furthermore, the accommodation slot 511 may not be provided with an opening on any side, and the sample holder 600 is placed from the above of the accommodation slot 511 into the accommodation slot 511 by means of a suction cup, a clamp, or other structures.

Further, referring to FIGS. 1 and 2, when the dispatching manipulator 500 is arranged between the sample aspiration region 400 and the other three regions, in this embodiment, the accommodation slot 511 has a width approximately equal to the distance from the recovery unit 300 and the temporary storage unit 200 to the sample aspiration region 400, and thus the accommodation slot 511 does not necessarily has a function of translation between the sample aspiration region 400 and the recovery unit 300 in this embodiment.

However, in other embodiments, if the distance from the recovery unit 300 and the temporary storage unit 200 to the sample aspiration region 400 is wider, being greater than the width of the accommodation slot 511, the dispatching drive mechanism can output a reciprocating motion along the X-axis, such that the sample holder storage mechanism can move to the junction of the regions along the X-axis. The X-axis is the direction of translation between the sample aspiration region 400 and the recovery unit 300 (the temporary storage unit 200). Referring to FIG. 4, the Y-axis, the X-axis, and the Z-axis are perpendicular to one another to form a so-called XYZ three-axis coordinate system.

Figure 5:
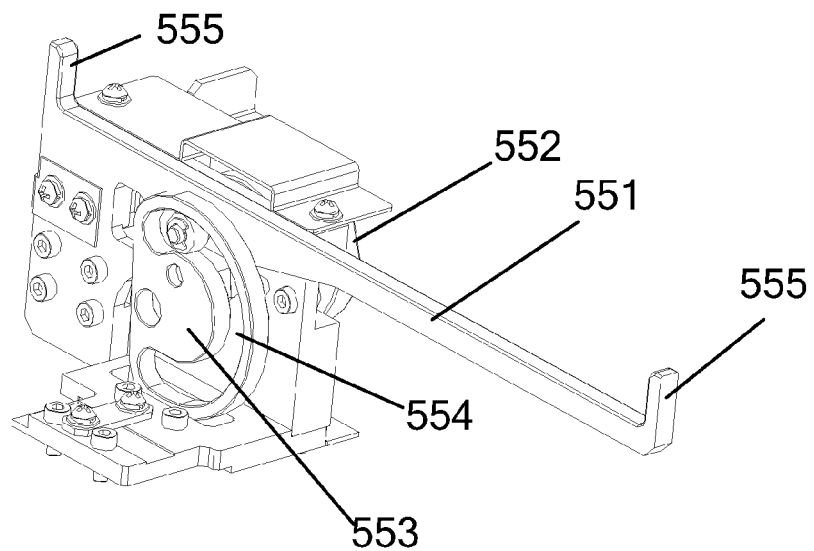
FIG. 5 is a schematic diagram of an actuation claw and an actuation claw drive mechanism in the sample feeding apparatus according to the one embodiment of the present application.

Further, when the sample holder storage mechanism uses the accommodation slot 511, in order to enable the dispatching manipulator 500 to actively transfer the sample holder 600 to other regions, with continued reference to FIGS. 4 and 5, in one embodiment, the dispatching manipulator 500 further comprises an actuation claw 551, and an actuation claw drive mechanism that drives the actuation claw 551 to move.

The actuation claw drive mechanism outputs the reciprocating motion along the Z-axis and the reciprocating motion along the X-axis. The Z-axis is perpendicular to the direction (X-axis) in which the sample holder 600 enters and leaves the accommodation slot 511, and the actuation claw 551 is driven by the actuation claw drive mechanism to move along the Z-axis, such that it can extend into and also retract from the slot cavity of the accommodation slot 511, so as to have a blocking effect on at least one side of the sample holder 600 in the slot cavity, so as to push the sample holder 600 to move during the translation.

The X-axis is the direction in which the sample holder 600 enters and leaves the accommodation slot 511, and the actuation claw 551 is driven by the actuation claw drive mechanism to move along the X-axis, such that the actuation claw 551 can be driven by the actuation claw drive mechanism to translate relative to the accommodation slot 511. When the actuation claw 551 extends into the accommodation slot 511, the translation can drive the sample holder 600 in the accommodation slot 511 to move, so as to unload the sample holder 600 out of the accommodation slot 511. Otherwise, the sample holder 600 can be pushed from the other regions into the slot cavity of the accommodation slot 511.

In this embodiment, referring to FIGS. 2-5, the actuation claw 551 is arranged below the accommodation slot 511, the bottom of the accommodation slot 511 is provided with an access opening 513 reserved for the actuation claw 551, such that the actuation claw 551 can extends into the accommodation slot 511 via the access opening 513, retract from the accommodation slot 511, and translate in the accommodation slot 511. The bottom of the temporary storage position 210 of the temporary storage unit 200 is provided with an avoidance opening 211 reserved for keeping off the actuation claw 551, such that after pushing the sample holder 600 to the temporary storage position 210, the actuation claw 551 can leave the temporary storage position 210 by means of the downward retraction of the avoidance opening 211. Otherwise, the actuation claw 551 can translate to the temporary storage position 210 through the avoidance opening 211, then extend out to hook up the sample holder 600, and then translate to push the sample holder 600 into the accommodation slot 511.

Referring to FIG. 5, in one embodiment, the actuation claw drive mechanism comprises an extension-retraction drive motor 552 and a cam 553 to implement the output of the Z-axis motion.

The cam 553 rotates with the output end of the extension-retraction drive motor 552, and has a closed guide slot 554. The actuation claw 551 is movably mounted in the guide slot 554 and is restricted to move in the guide slot 554. The distance from the slot wall of the guide slot 554 to the center of rotation of the cam 553 is unequal, and the slot wall of the guide slot 554 is generally arc-shaped, such that the actuation claw 551 is driven to move telescopically by the cam 553 during turning.

The turning of the cam 553 will drive the actuation claw 551 to move up and down along the Z-axis. In addition, a guide member, such as a guide pin, a guide hole, a guide slot, and a guide rail, may also be provided in the vertical direction to drive the actuation claw 551 to move smoothly.

The motion along the X-axis can be implemented by means of the following structure. Referring to FIG. 4, the actuation claw drive mechanism comprises a translation drive motor 531 and a third synchronous belt transmission mechanism 532. The third synchronous belt transmission mechanism 532 is mounted on the translation drive motor 531, and the extension-retraction drive motor 552 and the cam 553 are fixed on the synchronous belt of the third synchronous belt transmission mechanism 532. The synchronous belt of the third synchronous belt transmission mechanism 532 is arranged along the X-axis, and the extension-retraction drive motor 552 and the cam 553 may also be mounted thereon via a structure such as a mounting base or a mounting plate. The motion of the synchronous belt drives the extension-retraction drive motor 552 and the cam 553 to translate together along the X-axis. The X-axis movement is in a range that at least ensure that the sample holder 600 can be completely placed at the temporary storage position 210 and the sample holder 600 can be taken out from the temporary storage position 210.

With continued reference to FIG. 4, in one embodiment, the actuation claw drive mechanism further comprises a linear guide rail 533 used for guiding, so as to ensure the smooth movement.

The example structure in which the actuation claw 551 implements Z-axis and X-axis motions is described above, which may also be, in other embodiments, replaced by other structures that can implement a reciprocating motion in a certain direction, which is not limited to that shown in this embodiment.

By means of providing the actuation claw 551, the accommodation slot 511 can actively pick up and push the sample holder 600, which facilitates the movement of the sample holder 600 in some regions where no transfer structure is provided, such as the temporary storage unit 200.

Figure 6:
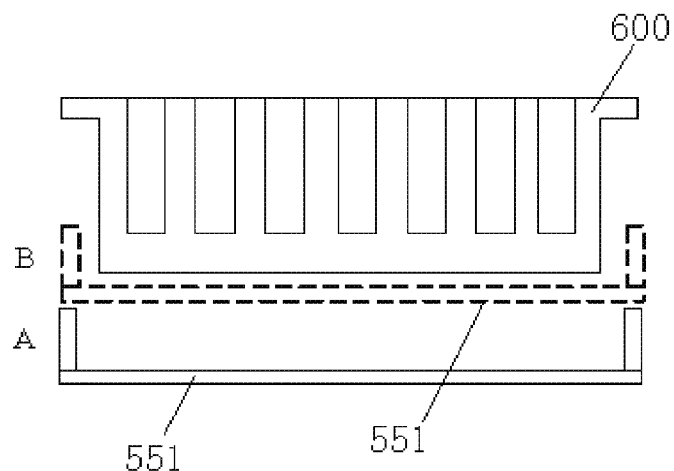
FIG. 6 is schematic diagram of the extension and retraction of the actuation claw shown in FIG. 5.
Figure 7:
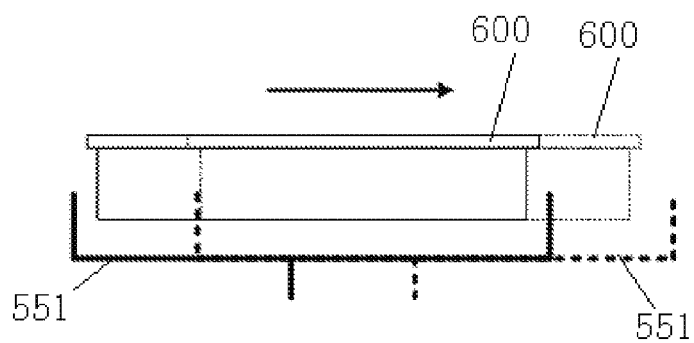
FIGS. 7 and 8 are schematic diagrams of sample holders when the actuation claw shown in FIG. 6 moves.
Figure 8:
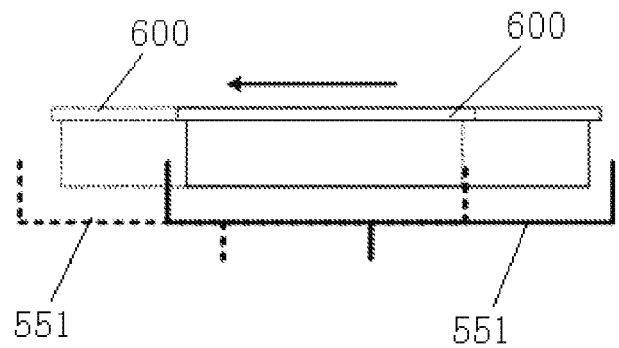

Referring to FIGS. 6-8, in one embodiment, the actuation claw 551 may have two pick-up claws 555 arranged opposite each other, with the distance between the pick-up claws 555 being greater than the length of the sample holder 600. When the actuation claw 551 extends into the accommodation slot 511, the sample holder 600 falls between the two pick-up claws 555, such that the pick-up claws 555 can carry the sample holder 600.

Referring to FIGS. 7 and 8, the positions where the sample holder 600 is fitted to the pick-up claws 555 are two side portions of the sample holder 600, such that when the sample holder 600 is carried toward the two sides, different pick-up claws 555 will be used, thereby reducing the travel of the apparatus in the Y-axis. For example, the solid and dashed lines in FIGS. 7 and 8 respectively indicate the positions of the actuation claw 551 before pushing the sample holder 600 and when pushing the sample holder 600 in place. FIG. 7 shows that when the sample holder 600 is pushed to the right, the pick-up claw on the left side is mainly used. FIG. 8 shows that when the sample holder 600 is pushed to the left, the pick-up claw on the right side is mainly used.

Of course, in some embodiments, the actuation claw 551 having one pick-up claw can also implement the pushing effect. However, if one pick-up claw is used, when the sample holder 600 is pushed in two opposite directions, the pick-up claw needs to move by a distance equal to or greater than one sample holder 600, which will increase the moving travel of the pick-up claw.

Referring to FIG. 6, the pick-up claw 555 has two positions in the Z-axis, i.e., an initial position A and an end position B. The initial position A is the position where the pick-up claw 555 retracts and the movement of the sample holder 600 will not be affected, and the end position B is an extended position where the sample holder 600 is just be capable of moving. The initial position A is detected by a sensor, such as a through-beam photoelectric sensor or a pressure sensor, and the end position B can be controlled by a parameter. Of course, the situation of being in place may also be determined by means of detection with a sensor.

In another aspect, in order to implement the Y-axis and Z-axis motions of the dispatching drive mechanism, in one embodiment, the dispatching drive mechanism comprises a first drive mechanism configured to drive the accommodation slot 511 to move along the Y-axis, and a second drive mechanism configured to drive the accommodation slot 511 to move along the Z-axis. The accommodation slot 511 is mounted on the second drive mechanism; and the second drive mechanism, the actuation claw 551 and the actuation claw drive mechanism are mounted on the first drive mechanism.

As a variant, the accommodation slot 511 may also be mounted on the first drive mechanism; and the first drive mechanism, the actuation claw 551 and the actuation claw drive mechanism are mounted on the second drive mechanism.

Referring to FIG. 4, in one embodiment, the first drive mechanism comprises a first stepping motor 521, and a first synchronous belt transmission mechanism 522 driven by the first stepping motor 521. The second drive mechanism, the actuation claw 551 and the actuation claw drive mechanism are mounted on the synchronous belt of the first synchronous belt transmission mechanism 522.

With continued reference to FIG. 4, the first drive mechanism further comprises a linear guide rail 523. The first stepping motor 521 drives the first synchronous belt mechanism 522 to move, and the second drive mechanism, the actuation claw 551 and the actuation claw drive mechanism are integrally mounted on the first synchronous belt mechanism 522 and can slide on the guide rail 523 to implement the movement in the Y-axis direction.

Further, with continued reference to FIG. 4, in one embodiment, the second drive mechanism comprises a second stepping motor 541, a lead screw 542 and a nut 543. The lead screw 542 and the nut 543 constitute a lead screw-nut mechanism. The drive motor 541 is connected to the lead screw-nut mechanism to drive the nut 543 moves up and down. The accommodation slot 511 is fixedly mounted on the nut 543, and moves up and down together with the nut 543.

Alternatively, the drive mechanisms may also implement the movement of the sample holder storage mechanism by other drive methods.

With continued reference to FIG. 4, in one embodiment, the actuation claw 551 is arranged separately from the second drive mechanism, that is, the actuation claw 551 has no lifting actions except for the lifting action generated by the actuation claw drive mechanism. In this case, the main task of the actuation claw 551 is to deliver the sample holder 600 into the temporary storage position 210 and take the sample holder 600 out of the temporary storage position 210, and therefore the actuation claw 551 is arranged corresponding to the temporary storage position 210 of the temporary storage unit 200 in terms of height. The sample feeding channel 810 of the feeding unit 100 and the sample recovery channel 820 of the recovery unit 300 can push the sample holder 600 by means of other pushing structures or by means of a self-contained pushing mechanism of the feeding unit 100 and the recovery unit 300.

In addition, in other embodiments, the actuation claw 551 and the actuation claw drive mechanism may also be lifted together with the accommodation slot 511, so as to complete the pushing operation at each junction.

In the apparatus shown in this embodiment, the dispatching process of the sample holder 600 can be roughly divided into several segments as follows:
1. the sample holder 600 moves from the feeding unit 100 to the temporary storage unit 200 for the temporary storage of the sample holder 600 before being tested;
2. the sample holder 600 moves from the temporary storage unit 200 to the sample aspiration region 400, waiting for the test of the sample;
3. the sample holder 600 completes the sample aspiration, and returns to the recovery unit 300 or the temporary storage unit 200 from the sample aspiration region 400, and then a user can take out the sample holder 600.

If necessary, the operation of delivering the sample holder 600 from the temporary storage unit 200 to the recovery unit 300 may also be added.

The transfer operation between the regions is mainly implemented by the dispatching manipulator 500.

The structure of this apparatus is configured reasonably so as to implement rapid response of automatic retest. Moreover, the volume is small. Under the same number of samples feeding and the same capacity of temporary storage, such a three-dimensional structure can reduce the footprint of the sample feeding and processing system, which facilitates the miniaturization of the sample feeding system. Furthermore, the number of samples feeding and the capacity of temporary storage can be adjusted arbitrarily, and the position and the number of layers of the functional regions can be adjusted as the number of samples feeding increases. Also, the structure of the apparatus is simple, and the dispatching process for the sample holder 600 is simplified and is easy to implement.

Embodiment II

This embodiment provides a sample feeding apparatus. This sample feeding apparatus is improved based on the sample feeding apparatus provided in the above embodiments, and the difference from Embodiment I will be mainly described here.

Figure 9:
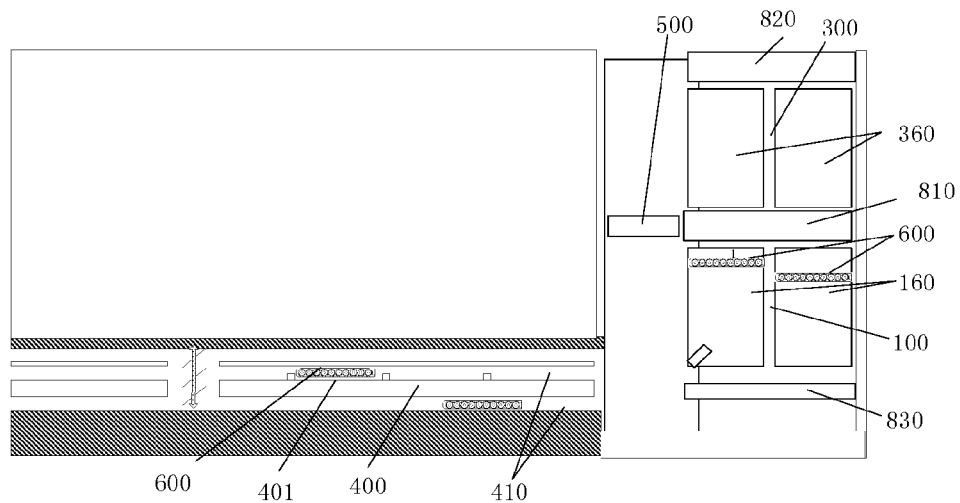
FIG. 9 is a simplified schematic diagram of a sample feeding apparatus according to a second embodiment of the present application.
Figure 10:
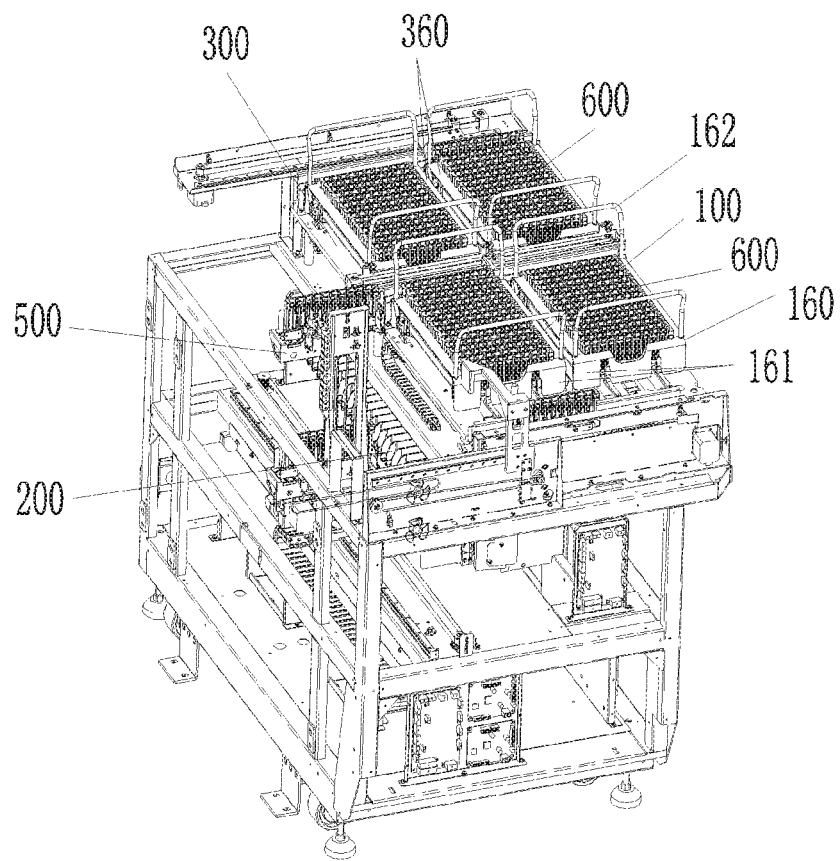
FIG. 10 is a view of a specific structure (excluding a sample aspiration region and a detection instrument) of the sample feeding apparatus according to the second embodiment of the present application.
Figure 11:
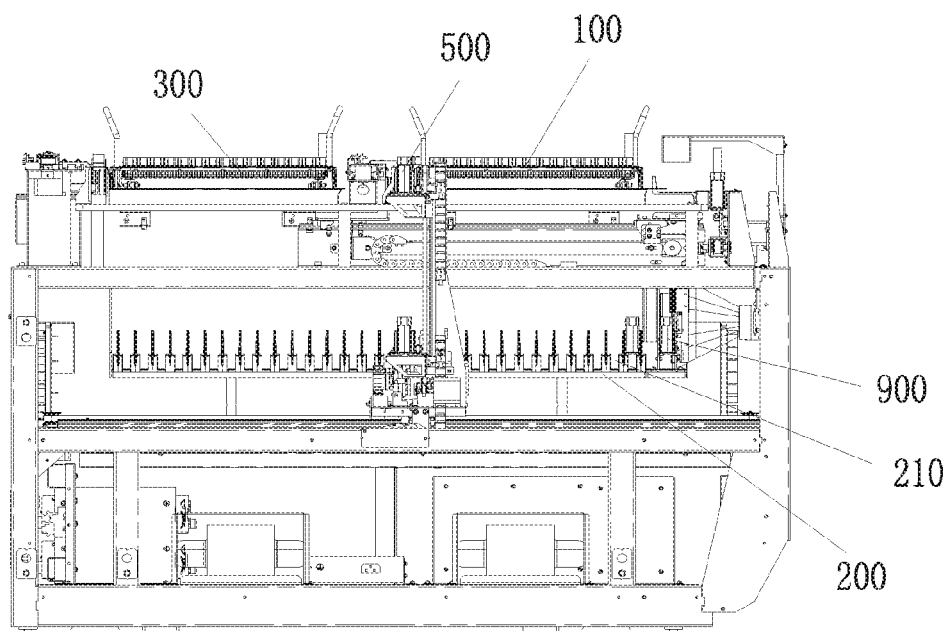
FIG. 11 is a schematic diagram of upper and lower layers in the structure shown in FIG. 10.

Referring to FIGS. 9-11, the temporary storage unit 200 has at least two temporary storage positions 210 arranged side-by-side. The structure of the temporary storage unit 200 can refer to the structure shown in Embodiment I. The feeding unit 100 and the recovery unit 300 are located directly above the temporary storage unit 200, and are arranged one behind the other in the arrangement direction of the temporary storage position 210 (Y-axis direction), the feeding unit 100 and the recovery unit 300 are located at one side of the dispatching manipulator 500, and the sample aspiration region 400 is located at the other side of the dispatching manipulator 500.

The feeding unit 100 has a feeding region, and the sample holder (with a sample being held in the sample holder) waiting for sample feeding is stored in the feeding region. The sample holders can be directly placed in the feeding region, and are subjected to sample feeding in sequence. The sample feeding for the sample holder can be implemented by means of some pushing mechanisms arranged inside the feeding unit 100 or a conveyor belt located at the bottom of the feeding region.

Furthermore, referring to FIGS. 9 and 10, in one embodiment, the feeding unit 100 comprises a storage assembly 160 that can store at least two sample holders 600. The operator can pick and place a sample by picking and placing the storage assembly 160. The storage assembly 160 can be internally provided with a structure that can hold the sample holder 600. For example, the storage assembly 160 shown in FIG. 10 uses a basket, which has a basket body 161 for holding the sample holder 600 and a handle 162 that can be gripped. Furthermore, the storage assembly 160 may be further internally provided with some fixing structures configured to fix the position of the sample holder 600 so as to prevent the sample holder 600 from shaking in the storage assembly 160.

The feeding unit 100 has a storage assembly placement position in which the storage assembly 160 is accessibly arranged. The storage assembly placement position may be an accommodation chamber or a placement platform, and some fixing structures can be provided on the storage assembly placement position to fix the storage assembly 160. Of course, in some embodiments, the storage assembly 160 may not be provided, and the sample holder 600 is directly transferred by some pushing mechanisms or a conveyor belt according to a set track.

Figure 12:
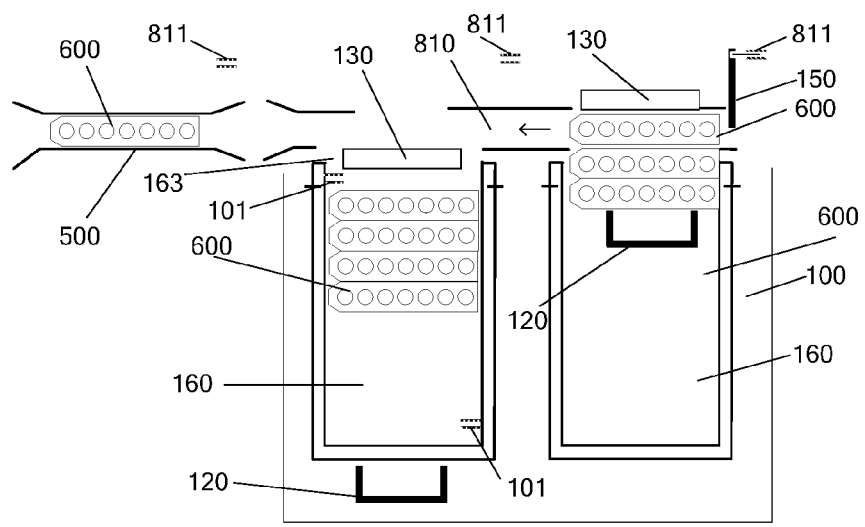
FIG. 12 is a schematic diagram of sample feeding of a feeding unit in the sample feeding apparatus according to the second embodiment of the present application.

Referring to FIG. 12, the storage assembly 160 has a sample outlet 163 where the sample holder 600 are moved into or out of the storage assembly 160. During the sample feeding, the sample holder 600 performs sample feeding from the sample outlet 163.

In order to know whether the storage assembly 160 is placed into the storage assembly placement position, in one embodiment, the storage assembly placement position is provided with a storage assembly detection mechanism configured to detect whether the storage assembly 160 is loaded. After the storage assembly 160 is placed in the storage assembly placement position, the storage assembly detection mechanism feeds back a detection signal to the control unit, and the control unit sends a subsequent instruction according to the detection signal.

Further, in order to improve the detection accuracy, referring to FIG. 12, in one embodiment, at least two storage assembly detection mechanisms 101 are provided and are respectively arranged at different positions on the bottom wall of the storage assembly placement position, and it is at least ensured that storage assembly detection mechanisms 101 are provided in regions, corresponding to two opposite sides of the storage assembly 160, on the bottom wall of the storage assembly placement position. Only when the storage assembly 160 is detected by both the two storage assembly detection mechanisms 101, it is determined that the storage assembly 160 has been placed, which can avoid the affection to the sample feeding due to the fact that the storage assembly detection mechanism 101 is accidentally touched or the storage assembly 160 is not placed in place.

In some embodiments, a remaining amount detection mechanism (not shown in the figure) may be further provided, which is configured to detect whether the sample holder 600 in the storage assembly 160 is unoccupied, such that the control unit controls the apparatus to stop the sample feeding or switches to the next storage assembly 160 to start the sample feeding.

The storage assembly 160 is not only applicable to the sample feeding apparatus shown in this embodiment, but can also be applicable to the sample feeding apparatus shown in Embodiment I and the sample feeding apparatus in other variants, for improving the efficiency of adding the sample holder 600 by the operator.

Referring to FIG. 12, as in embodiment I, in order to implement the sample feeding of the sample from the storage assembly 160, the feeding unit 100 in this embodiment has a feeding push-out mechanism 120. The feeding push-out mechanism 120 is configured to push the sample out of the sample outlet 163 from the storage position of the storage assembly 160.

Further, referring to FIGS. 9 and 12, in one embodiment, a sample feeding channel 810 is further comprised. The sample outlet 163 of the storage assembly 160 is in communication with the sample feeding channel 810, such that the sample (or the sample holder 600 holding the sample) can enter the dispatching manipulator 500 through the sample feeding channel 810 and the sample outlet 163.

Referring to FIG. 12, in one embodiment, a sample pushing mechanism 150 is further comprised. The sample pushing mechanism 150 has a moving travel toward the dispatching manipulator 500, and is configured to push the sample holder 600 from the sample feeding channel 810 to the dispatching manipulator 500.

An in-place detection mechanism is further provided in a path of the sample pushing mechanism 150, and is configured to detect the position of the sample pushing mechanism 150 and feedback the position to the control unit so as to control the action of the sample pushing mechanism.

Of course, in some embodiments, the sample holder 600 at the sample feeding channel 810 may also move from the sample feeding channel 810 to the dispatching manipulator 500 by means of a corresponding structure on the dispatching manipulator 500.

Referring to FIG. 12, if two or more storage assemblies 160 are used, in one embodiment, each of the storage assemblies 160 is correspondingly provided with a feeding push-back mechanism 130. The feeding push-back mechanism 130 is arranged corresponding to the sample outlet 163 of the storage assembly 160, and is configured to push the sample holder 600 in the feeding unit 100 back to the storage assembly 160 or limit the sample holder within the sample outlet 163.

In this embodiment, in addition to the emergency push-back function shown in Embodiment I, as shown in FIG. 2, the feeding push-back mechanism 130 may also function to, during the sample feeding of one of the storage assemblies 160, limit the sample holders 600 in other storage assemblies 160 in a state of no sample feeding, to set positions, so as to prevent the sample holders 600 in the storage assemblies 160 in the state of no sample feeding from entering the sample feeding channel 810 to obstruct the sample holder 600 that is carrying out sample feeding.

The feeding push-out mechanism 120, the feeding push-back mechanism 130 and the sample pushing mechanism 150 may implement the operation for the sample holder 600 by means of various structures, such as a push rod, an actuation block, a suction cup, and a clamp.

Of course, referring to FIG. 9, in some embodiments, an emergency sample feeding channel 830 may be separately provided. An outlet of the emergency sample feeding channel 830 is arranged facing the dispatching manipulator 500, such that the dispatching manipulator 500 can quickly obtain an emergency sample. For a sample feeding apparatus provided with a special emergency sample feeding channel 830, the feeding push-back mechanism 130 may not have the emergency push-back function.

Furthermore, the sample aspiration region 400 generally comprises a sample aspiration and transfer channel 410 configured to transfer the sample holder received the sample vessel with a sample for sample aspiration. In some embodiments, an emergency sample aspiration and transfer channel may be further separately provided and are used exclusively for an emergency sample, such that the emergency sample can quickly reach the sample aspiration position for sample aspiration and for detection and analysis.

Further, the recovery unit 300 is configured to recover the tested sample holder 600 (with a sample being held in the sample holder 600). The sample holder 600 may be directly placed in the recovery unit 300. The recovery of the sample holder 600 in the recovery unit 300 can be implemented by means of some pushing mechanisms arranged inside the recovery unit 300 or a conveyor belt located at the bottom of the recovery unit 300.

Figure 13:
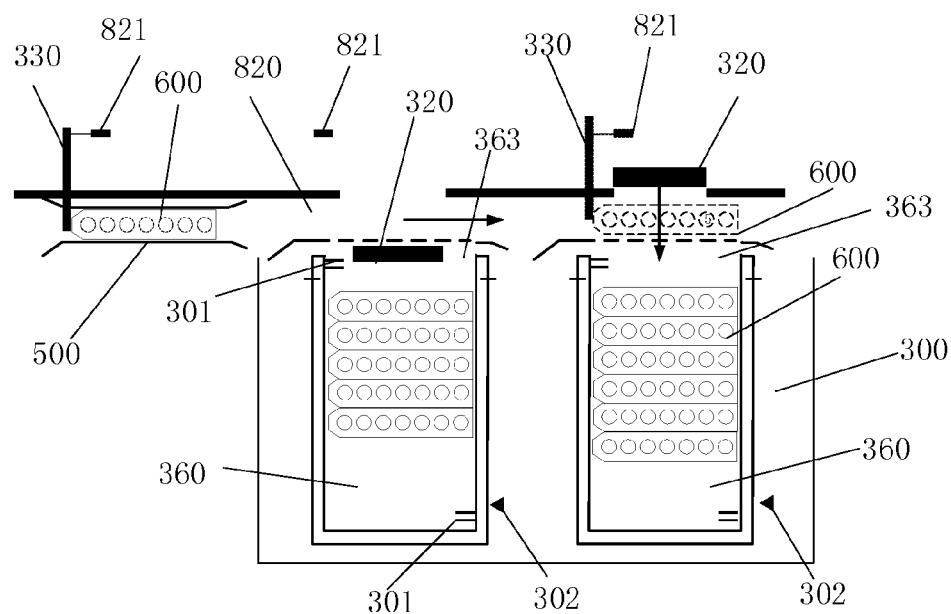
FIG. 13 is a schematic diagram of sample recovery of a recovery unit in the sample feeding apparatus according to the second embodiment of the present application.

In some embodiments, referring to FIGS. 9, 10 and 13, the recovery unit 300 comprises a recovery assembly 360 that can store at least two sample holders 600. The recovery assembly 360 has a recovery inlet 363 used for the sample holder 600 to enter. The recovery unit 300 has a recovery assembly placement position. The recovery assembly placement position may be an accommodation chamber or a placement platform, and some fixing structures may be provided on the recovery assembly placement position to fix the recovery assembly 360. The recovery assembly 360 is accessibly arranged in the recovery assembly placement position, and can recover two or more sample holders 600. After the recovery assembly 360 is full, the operator can remove the storage assembly 160 and take away the storage assembly together with the recovered sample holder 600.

Referring to FIG. 13, in one embodiment, the recovery unit 300 comprises a recovery push-in mechanism 320. The recovery push-in mechanism 320 is configured to push the recovered sample into the recovery assembly 360, such that the samples are arranged in alignment in the recovery assembly 360.

Further, in order to know whether the recovery assembly 360 is placed into the recovery assembly placement position, in one embodiment, the recovery assembly placement position is provided with a recovery assembly detection mechanism configured to detect whether the recovery assembly 360 is loaded. After the recovery assembly placement position is loaded into the recovery assembly 360, the recovery assembly detection mechanism feeds back the detection signal to the control unit, and the control unit sends a subsequent instruction according to the detection signal.

Further, in order to improve the detection accuracy, referring to FIG. 13, in one embodiment, at least two recovery assembly detection mechanisms 301 are provided and are respectively arranged at different positions on the bottom wall of the recovery assembly placement position, and it is at least ensured that recovery assembly detection mechanisms 301 are provided in regions, corresponding to two opposite sides of the recovery assembly 360, on the bottom wall of the recovery assembly placement position. Only when the recovery assembly 360 is detected by both the two recovery assembly detection mechanisms 301, it is determined that the recovery assembly 360 has been placed, which can avoid the affection to the sample feeding due to the fact that the recovery assembly detection mechanism 301 is accidentally touched or the recovery assembly 360 is not placed in place.

In some embodiments, a full detection mechanism 302 may be further provided, which is configured to detect whether the sample holder 600 in the recovery assembly 360 is full, such that the control unit controls the apparatus to stop the recovery or switches to the next recovery assembly 360 to start recovery of the sample holder 600.

Similarly, the recovery assembly 360 is not only applicable to the sample feeding apparatus shown in this embodiment, but can also be applicable to the sample feeding apparatus shown in Embodiment I and the sample feeding apparatus in other variants, for improving the efficiency of adding the sample holder 600 by the operator.

Further, referring to FIG. 13, in one embodiment, a sample recovery channel 820 is further comprised. The sample recovery channel 820 is in communication with the recovery unit 300, such that the sample on the dispatching manipulator 500 can enter the recovery unit 300 through the sample recovery channel 820.

Figure 15:
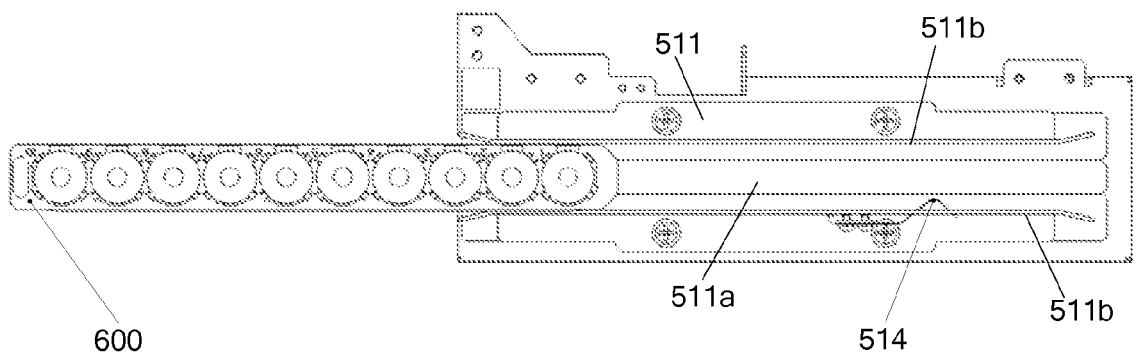
FIG. 15 is a schematic structural diagram of an accommodation slot of the dispatching manipulator in the sample feeding apparatus according to the second embodiment of the present application.

Referring to FIG. 15, a recovery pushing mechanism 330 is further comprised. The recovery pushing mechanism 330 is configured to push the sample from the dispatching manipulator 500 to a recovery inlet of the recovery unit 300, i.e., the recovery inlet 363 of the recovery assembly 360.

An in-place detection mechanism 811 is provided in a path of the recovery pushing mechanism 330, so as to detect the position of the recovery pushing mechanism 330.

In other embodiments, the sample holder 600 may also be actively loaded into the sample recovery channel 820 by the dispatching manipulator 500, without the need to provide a recovery pushing mechanism 330.

The storage assembly 160 and the recovery assembly 360 may have the same structure, such as the same basket structure. Furthermore, the two apparatuses may also have different structures according to their own needs.

In one embodiment, the feeding unit 100 uses a storage assembly 160 for sample feeding, and the recovery unit 300 uses a recovery assembly 360 for sample recovery. The recovery unit 300 comprises at least two recovery assemblies 360, the feeding unit 100 comprises at least two storage assemblies 160, and the number of the recovery assemblies 360 is the same of the number of the r storage assemblies 160 so as to ensure the consistency of the number of sample feeding and the number of recovery.

As shown in FIG. 9, an embodiment in which the sample feeding channel 810 and the sample recovery channel 820 are arranged separately is described above. In other embodiments, a sample access channel is provided between the feeding unit 100 and the recovery unit 300, the sample access channel is in communication with both the feeding unit 100 and the recovery unit 300, for both the sample feeding and the sample recovery. The dispatching manipulator 500 can be joined with the sample access channel for the transfer of samples. For example, it will be described based on the embodiment shown in FIG. 9, the sample feeding channel 810 is replaced with a sample access channel, and during the sample feeding, the feeding unit 100 uses the sample access channel to perform sample feeding. One end, near the sample access channel, of the recovery unit 300 serves as a recovery inlet, and during the sample recovery, the sample holder 600 is still recovered from the sample access channel (i.e., the position shown by the sample feeding channel 810 in the figure) and enters the recovery unit 300.

Further, in some embodiments, the sample access channel is provided with a sample access pushing mechanism configured to push the sample out of and back into the sample access channel.

In another aspect, referring to FIG. 11, in one embodiment, a scanning unit 900 used for scanning a sample is further comprised. The scanning unit 900 comprises a scanning channel, and a scanning apparatus arranged on the scanning channel. The scanning channel and the scanning apparatus are not shown in detail in the figure. The scanning channel is arranged below the recovery unit 300 and the feeding unit 100, and the scanning channel and the temporary storage unit 200 are arranged one behind the other.

When the dispatching manipulator 500 obtains a sample for sample feeding, the sample first moves to the scanning unit 900 below for scanning, and is then delivered into the sample aspiration region 400 or into the temporary storage unit 200 for temporary storage.

Of course, In some embodiments, the scanning unit 900 may also be arranged in the sample access channel, and the sample for sample feeding is scanned during the sample feeding.

Furthermore, the scanning unit 900 may also be arranged above the temporary storage unit 200, that is, located on the same layer as the feeding unit 100 and the recovery unit 300.

Figure 14:
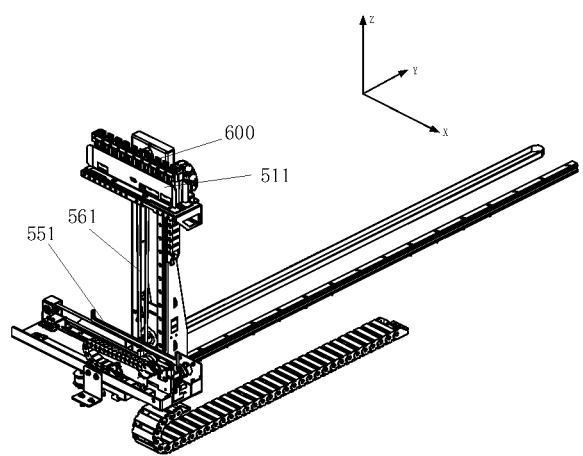
FIG. 14 is a schematic structural diagram of a dispatching manipulator in the sample feeding apparatus according to the second embodiment of the present application.

Further, in this embodiment, the dispatching manipulator 500 may have the structure as shown in Embodiment I. Furthermore, on the basis of the structure shown in Embodiment I, referring to FIG. 14, in one embodiment, the second drive mechanism uses an electric motor (in this figure, the electric motor is blocked and not shown, but it does not affect the understanding therefor) to drive the synchronous belt transmission mechanism 561 to implement the movement in the Z-axis direction, so as to replace the rack and pinion transmission structure in Embodiment I. The accommodation slot 511 is fixedly mounted on the synchronous belt 561, and moves up and down together with the synchronous belt 561.

Further, referring to FIG. 15, in one embodiment, in order to ensure the positioning accuracy of the sample holder 600 in the accommodation slot 511 to avoid overswing, the bottom wall 511a and/or the side wall 511b of the accommodation slot 511 are made of rubber, which increases the friction between the bottom wall 511a and/or the side wall 511b and the sample holder 600, such that the sample holder 600 can be secured in the accommodation slot 511.

In addition, with continued reference to FIG. 15, a protruding elastic member 514, such as an elastic sheet, is mounted at the side wall 511b of the accommodation slot 511 and is configured to apply an elastic force to the sample holder 600 when the sample holder 600 enters the accommodation slot 511 to help the sample holder 600 to be secured in the accommodation slot 511.

Figure 16:
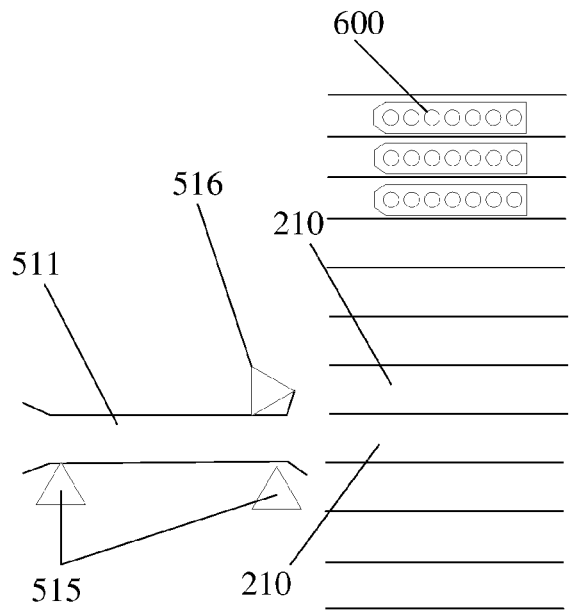
FIG. 16 is a schematic diagram of a detection mechanism on the accommodation slot of the dispatching manipulator in the sample feeding apparatus according to the second embodiment of the present application.

Further, referring to FIG. 16, in one embodiment, the accommodation slot 511 is internally provided with a sample holder detection mechanism 515 that detects whether there is a sample holder 600, and at least two sample holder detection mechanisms 515 are provided and are arranged in the accommodation slot 511 in a lengthwise direction of the accommodation slot 511. Only when the sample holder 600 covers both the two sample holder detection mechanisms 515, it is considered that the sample holder 600 safely reaches the accommodation slot 511, and then the control unit controls the accommodation slot 511 to perform other actions, such as moving along the Y-axis.

Furthermore, with continued reference to FIG. 16, the storage mechanism for the sample holder 600 is provided with a vacancy detection mechanism 516 configured to detect whether there is a sample holder 600 at the temporary storage position 210 of the temporary storage unit 200. The vacancy detection mechanism 516 is arranged facing the temporary storage position 210, the vacancy detection mechanism 516 is spaced apart from the center of the accommodation slot 511 just by a distance equal to one temporary storage position 210, and thus when the accommodation slot 511 is aligned with one of the temporary storage positions 210, the vacancy detection mechanism 516 can detect whether there is a sample holder 600 at the temporary storage position 210 next to this the temporary storage position 210 so as to give a feedback to the control unit.

Embodiment III

Embodiment III provides a control method for a sample feeding apparatus.

The sample feeding apparatus comprises a feeding unit configured to load a sample to be processed, a temporary storage unit configured to temporarily store the sample, a recovery unit configured to recover the processed sample, a sample aspiration region, a dispatching manipulator configured to dispatch the sample, and a control unit. At least two of the feeding unit, the temporary storage unit, and the recovery unit together form a vertical stack structure.

In addition, the sample feeding apparatus may also be either of the sample feeding apparatuses in Embodiment I and Embodiment II.

Figure 17:
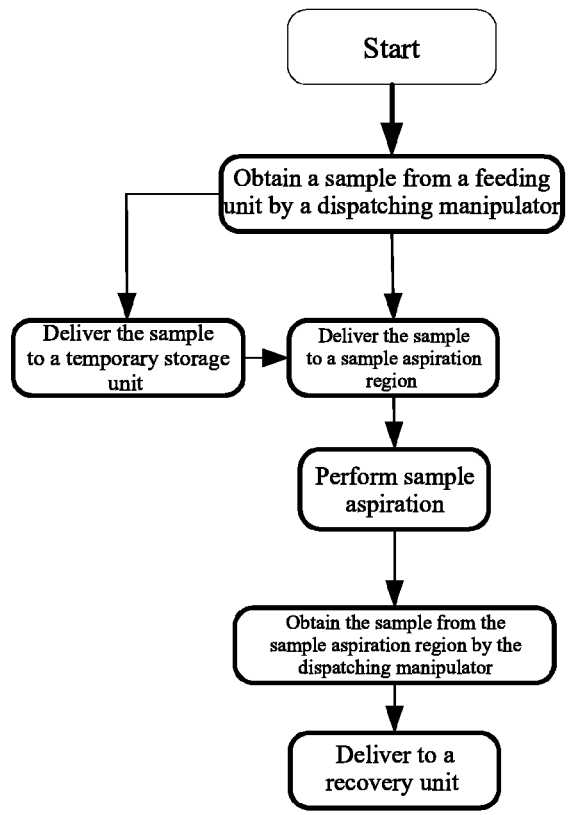
FIG. 17 is a conventional flow chart of a control method for a sample feeding apparatus according to one embodiment of the present application.

Referring to FIG. 17, the control method comprises:

a conventional sample feeding step, in which the dispatching manipulator receives a sample from the feeding unit, and then delivers the sample to the temporary storage unit for temporary storage or to the sample aspiration region.

In generally, the first sample subjected to sample feeding will be directly delivered to the sample aspiration region instead of being temporarily stored in the temporary storage unit. Of course, whether the sample is temporarily stored can be determined and controlled by the control unit.

The control method comprises a recovery step, in which the dispatching manipulator delivers the sample after sample aspiration to the recovery unit for recovery.

Further, in one embodiment, in the sample feeding apparatus, the feeding unit and the recovery unit are located above, and the temporary storage unit is located below.

For such a structure, in the conventional sample feeding step, when a sample needs to be carried to the temporary storage unit, the dispatching manipulator obtains the sample from the feeding unit, and the control unit then controls the dispatching manipulator to move downwards such that the sample is delivered into the temporary storage unit for temporary storage and then delivered to the sample aspiration region for sample aspiration. If temporary storage is not required, the sample can be directly delivered to the sample aspiration region.

Further, in one embodiment, the sample feeding apparatus further comprises a scanning unit configured to scan the sample.

In some embodiments, the scanning unit and the feeding unit are arranged side-by-side above the temporary storage unit, and the scanning unit is in communication with the sample outlet of the feeding unit.

Figure 18:
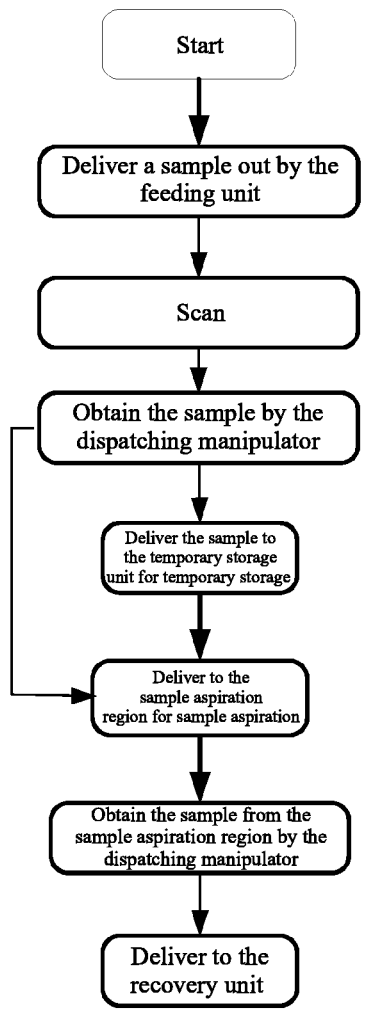
FIGS. 18 and 19 are two flow charts, with a scanning step being added, of the control method for a sample feeding apparatus according to the one embodiment of the present application.

For this structure, referring to FIG. 18, the control method further comprises:

a scanning step, in which the control unit controls the sample unloaded by the feeding unit to pass through the scanning unit for scanning, and the scanned sample is delivered to the dispatching manipulator for dispatching. The dispatching by the dispatching manipulator may be the operation to deliver the sample to the sample aspiration region, to deliver the sample to the temporary storage unit for temporary storage, or other operations.

Alternatively, in other embodiments, the scanning unit is arranged below the recovery unit and the feeding unit, and the scanning unit and the temporary storage unit are arranged one behind the other.

Figure 19:
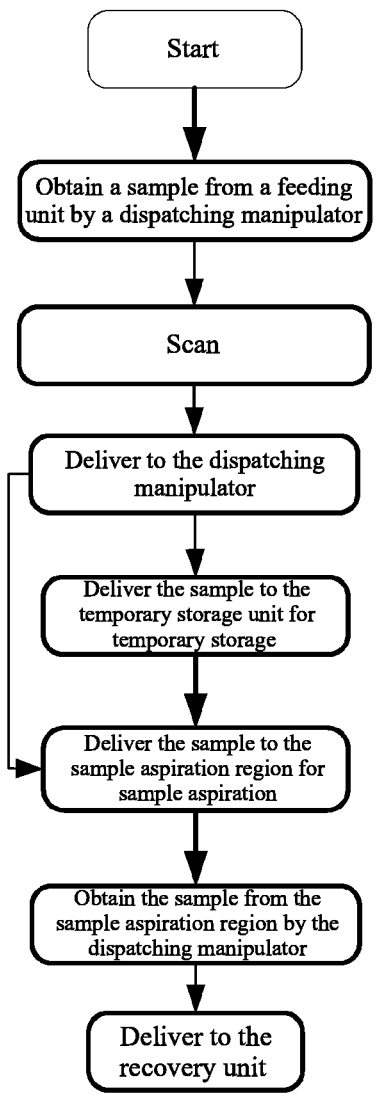

For this structure, referring to FIG. 19, the control method further comprises:

a scanning step, in which when the dispatching manipulator obtains a sample during the sample feeding, the control unit controls the dispatching manipulator to move downwards to deliver the sample to the scanning unit for scanning, and the scanned sample is delivered to the dispatching manipulator, and is subsequently delivered by the dispatching manipulator to the temporary storage unit for temporary storage and then delivered to the sample aspiration region for sample aspiration, or is directly delivered to the sample aspiration region by the dispatching manipulator.

The sample obtained by the dispatching manipulator during the sample feeding may be from the feeding unit or from the emergency sample feeding operation (if the apparatus allows for the emergency sample feeding operation).

Figure 20:
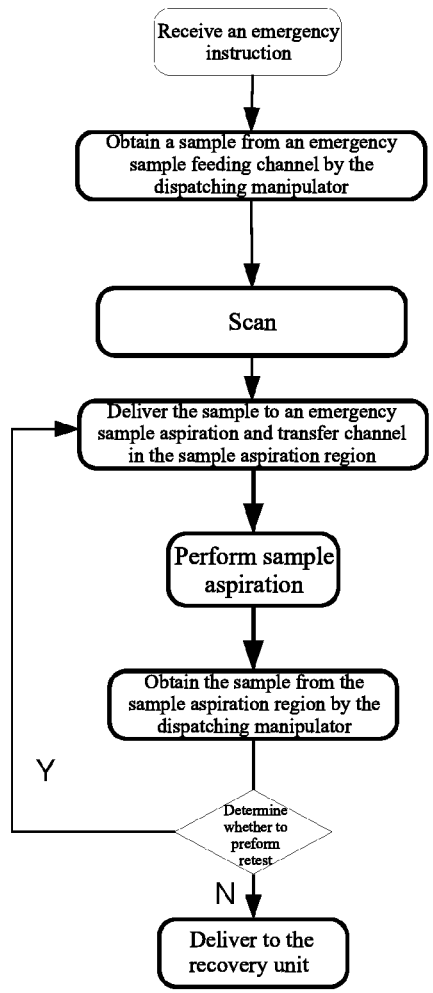
FIG. 20 is a flow chart of the control method for a sample feeding apparatus in the event of emergency according to the one embodiment of the present application.

Further, in one embodiment, the sample feeding apparatus further comprises an emergency channel. Referring to FIG. 20, the control method further comprises:

an emergency sample feeding step, in which when receiving an emergency indication, the control unit indicates the dispatching manipulator to preferentially obtain a sample from the emergency channel after completing the current operation instruction and deliver the sample to the sample aspiration region for sample aspiration.

Further, in some embodiments, the sample aspiration region has a sample aspiration and transfer channel, and an emergency sample aspiration and transfer channel. The sample aspiration and transfer channel is configured to transfer the sample supplied from the feeding unit so as to carry the sample to the sample aspiration position. The emergency sample aspiration and transfer channel is configured to transfer the sample supplied from the emergency channel in the emergency sample feeding step so as to carry the sample to the sample aspiration position.

In this regard, referring to FIG. 20, in the emergency sample feeding step described above, the sample supplied from the emergency channel is delivered to the emergency sample aspiration and transfer channel by the dispatching manipulator, such that the sample is directly transferred to the sample aspiration position instead of being delivered to the sample aspiration and transfer channel.

Figure 21:
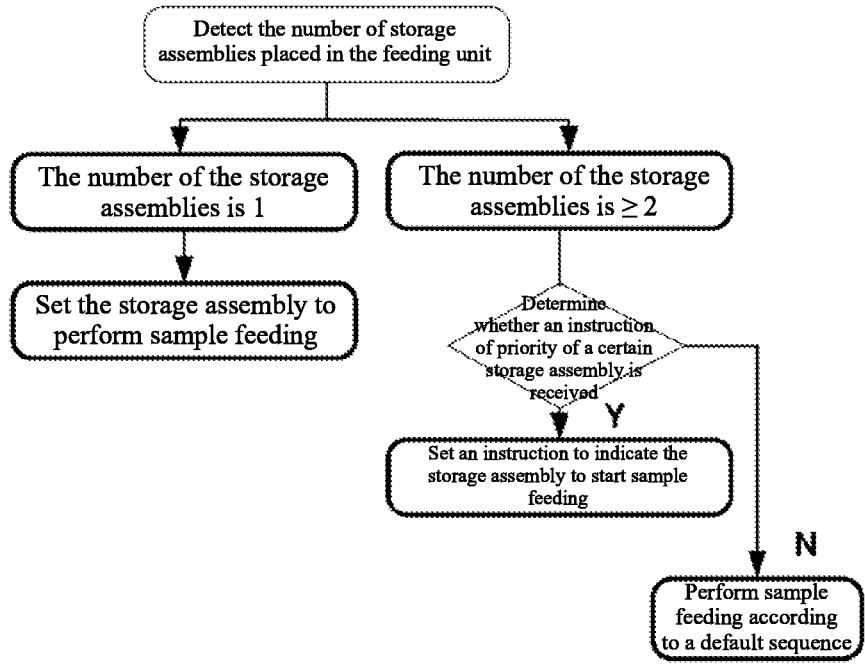
FIG. 21 is a flow chart of determining which feeding unit to perform sample feeding in the control method for a sample feeding apparatus according to the one embodiment of the present application.

Further, in one embodiment, in the sample feeding apparatus, the feeding unit has at least two accessible storage assemblies. In this regard, referring to FIG. 21, in the conventional sample feeding step, the control unit determines the number of the storage assemblies in the feeding unit; if there is only one storage assembly, sample feeding is carried out from the storage assembly; if there are two or more storage assemblies, the control unit determines whether an instruction of priority sample feeding of one of the storage assemblies is received, if so, the storage assembly specified by the instruction is preferentially controlled to perform sample feeding; and if not, the storage assemblies are controlled to perform sample feeding according to a preset sequence.

Further, in the conventional sample feeding step, the control unit may also detect whether the number of samples in the storage assembly of current sample feeding is zero, if so, the control unit activates another storage assembly for sample feeding or sends a signal that the storage assembly is unoccupied.

Figure 22:
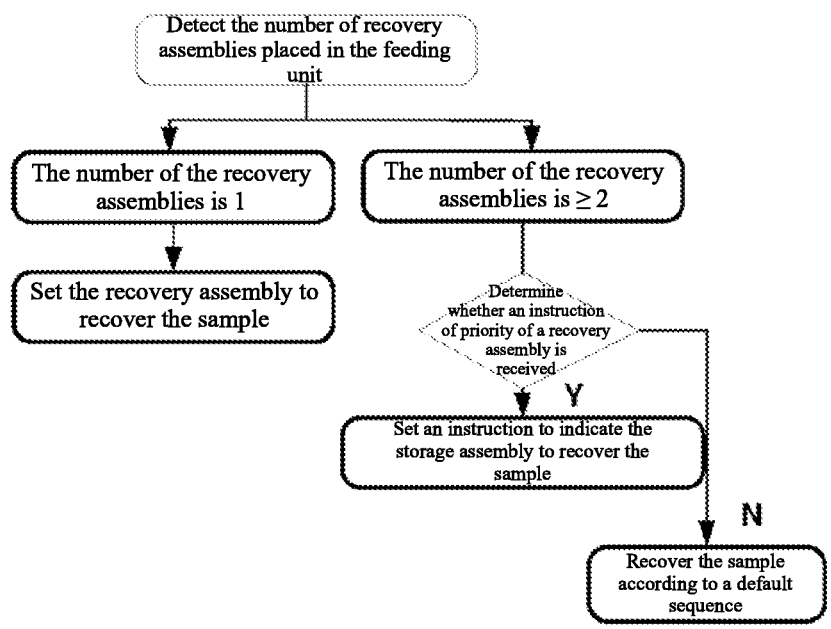
FIG. 22 is a flow chart of determining which recovery unit to perform sample recovery in the control method for a sample feeding apparatus according to the one embodiment of the present application.

Further, in one embodiment, in the sample feeding apparatus, the recovery unit comprises a recovery assembly capable of storing at least two sample holders. In this regard, referring to FIG. 22, in the recovery step, the control unit determines the number of recovery assemblies in the recovery unit; if there is only one recovery assembly, the recovery assembly is set to recover the sample; if there are two or more recovery assemblies, the control unit determines whether an instruction of priority sample recovery of one of the recovery assemblies is received, if so, the recovery assembly specified by the instruction is preferentially controlled to recover the sample; and if not, the recovery assemblies are controlled to recover the sample according to a preset sequence.

Further, in the recovery step, the control unit may also detect whether the currently operated recovery assembly is full, if so, the control unit activates another recovery assembly to recover the sample or sends a signal that the recovery assembly is full.

Embodiment IV

This embodiment provides a sample analyzing device, which comprises a sample feeding apparatus of any one of the embodiments described above, and a detection instrument configured to detect a sample. The detection instrument is arranged corresponding to the sample aspiration region of the sample feeding apparatus, and the sample is subjected to sample aspiration at the sample aspiration position and is subjected to related analysis and processing.

Specific examples are used above to explain the present application, but they are merely configured to help understand the present application and not to limit the present application. For those skilled in the art, changes may be made to the specific embodiments described above in accordance with the concept of the present application.

The invention claimed is:

1. A sample feeding apparatus, comprising:
   a feeding unit configured to receive sample vessels, each sample vessel having a sample to be processed;
   a temporary storage unit having a temporary storage position and configured to temporarily store the sample vessels;
   a recovery unit configured to recover the sample vessels with processed samples, wherein at least two of the feeding unit, the temporary storage unit, and the recovery unit together form a vertical stack structure, wherein the feeding unit and the recovery unit are located above the temporary storage unit;
   a sample aspiration region configured to provide a sample aspiration position thus enabling a detection instrument to aspirate the sample from each sample vessel;
   a dispatching manipulator configured to transfer the sample vessels among the feeding unit, the temporary storage unit, the recovery unit, and the sample aspiration region; and
   a control unit configured to control the dispatching manipulator to transfer at least part of the sample vessels from the feeding unit to the sample aspiration region for a sample aspiration via the temporary storage unit, and/or transfer at least part of the sample vessels completing the sample aspiration to the recovery unit via the temporary storage unit.

2. The apparatus of claim 1, wherein the feeding unit and the recovery unit are located above the temporary storage unit.

3. The apparatus of claim 2, wherein
the temporary storage unit has at least two temporary storage positions arranged side-by-side,
the feeding unit and the recovery unit are arranged one behind the other in a direction of a lengthwise orientation of each of the at least two temporary storage positions,
the feeding unit and the recovery unit are located at one side of the dispatching manipulator, and
the sample aspiration region is located at the other side of the dispatching manipulator.

4. The apparatus of claim 2, wherein the feeding unit and the dispatching manipulator are located at different sides of the recovery unit, and the sample aspiration region is located at one side of the dispatching manipulator that is away from the recovery unit.

5. The apparatus of claim 1, wherein
the feeding unit is configured to receive a storage assembly for storing at least two sample holders, and each of the sample holders is configured to receive sample vessels, wherein the storage assembly has a sample outlet where the sample holders are moved into or out of the storage assembly;
the feeding unit has a storage assembly placement position, wherein the storage assembly is accessibly arranged in the storage assembly placement position, and the storage assembly placement position is provided with a storage assembly detection mechanism configured to detect whether the storage assembly is loaded properly; and
the feeding unit further comprises a feeding push-out mechanism, which corresponds to the sample outlet and is configured to push the sample holders out of the sample outlet from a sample holder storage position in the storage assembly.

6. The apparatus of claim 5, further comprising a sample feeding channel, wherein the sample outlet is in communication with the sample feeding channel such that the sample holders on the storage assembly are transferred to the dispatching manipulator through the sample feeding channel and the sample outlet.

7. The apparatus of claim 6, further comprising a sample pushing mechanism, wherein the sample pushing mechanism is configured to push the sample holders to the dispatching manipulator along the sample feeding channel.

8. The apparatus of claim 6, wherein the feeding unit further comprises a feeding push-back mechanism, which is arranged corresponding to the sample outlet and is configured to push the sample holders on the sample feeding channel back to the storage assembly or prevent the sample holders on the storage assembly from entering into the sample feeding channel.

9. The apparatus of claim 1, wherein the recovery unit is configured to receive a recovery assembly for storing at least two sample holders, and each of the sample holders is configured to receive sample vessels, wherein the recovery assembly has a recovery inlet where the sample holders are moved into the recovery assembly;
the recovery unit has a recovery assembly placement position, wherein the recovery assembly is accessibly arranged in the recovery assembly placement position, and the recovery assembly placement position is provided with a recovery assembly detection mechanism configured to detect whether the recovery assembly is loaded properly; and
the recovery unit further comprises a recovery push-in mechanism, which corresponds to the recovery inlet and is configured to push the sample holders into the recovery assembly.

10. The apparatus of claim 9, further comprising a sample recovery channel, wherein the sample recovery channel is in communication with the recovery inlet such that the sample holders are transferred from the dispatching manipulator into the recovery assembly through the sample recovery channel and the recovery inlet.

11. The apparatus of claim 10, further comprising a recovery pushing mechanism, wherein the recovery pushing mechanism is configured to push the sample holders from the dispatching manipulator to the recovery inlet along the sample recovery channel.

12. The apparatus of claim 1, wherein
the recovery unit comprises at least two recovery assemblies,
the feeding unit comprises at least two storage assemblies,
the number of the recovery assemblies is the same as the number of the storage assemblies, and
each recovery assembly corresponds to each storage assembly.

13. The apparatus of claim 1, wherein
a sample access channel is provided between the feeding unit and the recovery unit,
the sample access channel is in communication with both the feeding unit and the recovery unit, and
the dispatching manipulator is aligned with the sample access channel while transferring the sample vessels from the feeding unit or into the recovery unit.

14. The apparatus of claim 1, further comprising an emergency sample feeding channel, wherein the emergency sample feeding channel is separately arranged from a sample feeding channel, with an outlet thereof being arranged facing the dispatching manipulator.

15. The apparatus of claim 1, further comprising a scanning unit configured to scan the sample,
wherein the feeding unit is provided with a sample feeding channel, and the scanning unit is arranged in the sample feeding channel; or
wherein a sample access channel is provided between the feeding unit and the recovery unit, the sample access channel is in communication with both the feeding unit and the recovery unit, and the sample access channel is provided with the scanning unit.

16. The apparatus of claim 1, further comprising a scanning unit configured to scan the sample, wherein
the scanning unit is arranged below the recovery unit and the feeding unit, and the scanning unit and the temporary storage unit are arranged one behind the other; or
the scanning unit is arranged above the temporary storage unit, and the scanning unit and the recovery unit or the feeding unit are arranged side-by-side.

17. The apparatus of claim 1, wherein the dispatching manipulator comprises a sample holder storage mechanism for receiving a sample holder and a dispatching drive mechanism,
wherein the sample holder is configured to receive the sample vessels and the dispatching drive mechanism outputs a reciprocating motion in a vertical direction so as to drive the sample holder storage mechanism to at least move in the vertical direction.

18. The apparatus of claim 17, wherein the temporary storage unit has at least two temporary storage positions arranged side-by-side, and the dispatching drive mechanism outputs a reciprocating motion in an arrangement direction of the temporary storage positions, such that the sample holder storage mechanism is driven to any of the temporary storage positions.

19. A sample analyzing device, comprising:
   the sample feeding apparatus of claim 1; and
   the detection instrument configured to detect the sample of each sample vessel, wherein the detection instrument is arranged corresponding to the sample aspiration region of the sample feeding apparatus.

* * * * *